(12) United States Patent
Ke et al.

(10) Patent No.: US 9,147,029 B2
(45) Date of Patent: Sep. 29, 2015

(54) STRETCH DUMMY CELL INSERTION IN FINFET PROCESS

(71) Applicant: Taiwan Semiconductor Manufacturing Company, Ltd., Hsin-Chu (TW)

(72) Inventors: Li-Sheng Ke, Hsin-Chu (TW); Jia-Rong Hsu, New Taipei (TW); Wen-Ju Yang, Hsin-Chu (TW); Hung-Lung Lin, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/325,868

(22) Filed: Jul. 8, 2014

(65) Prior Publication Data

US 2014/0325466 A1    Oct. 30, 2014

Related U.S. Application Data

(63) Continuation-in-part of application No. 13/833,958, filed on Mar. 15, 2013, now Pat. No. 8,869,090.

(60) Provisional application No. 61/776,457, filed on Mar. 11, 2013.

(51) Int. Cl.
  *G06F 17/50* (2006.01)
  *H01L 29/66* (2006.01)
  *H01L 29/78* (2006.01)

(52) U.S. Cl.
  CPC ...... *G06F 17/5072* (2013.01); *H01L 29/66795* (2013.01); *G06F 2217/12* (2013.01); *H01L 29/785* (2013.01)

(58) Field of Classification Search
  CPC ......... G06F 17/30; G06F 17/50; H01L 27/02; H01L 27/12; H01L 29/66
  USPC .......... 716/119, 107, 110, 112; 257/173, 365; 438/296
  See application file for complete search history.

(56) References Cited

U.S. PATENT DOCUMENTS

| | | | |
|---|---|---|---|
| 8,726,220 B2 * | 5/2014 | Lin et al. | 716/135 |
| 2004/0222528 A1 * | 11/2004 | Kunikiyo | 257/758 |
| 2006/0202239 A1 * | 9/2006 | Holmes et al. | 257/288 |
| 2007/0124714 A1 | 5/2007 | Ono et al. | |
| 2011/0108891 A1 * | 5/2011 | Becker et al. | 257/211 |
| 2011/0151359 A1 * | 6/2011 | Shieh et al. | 430/5 |
| 2012/0278781 A1 * | 11/2012 | Wann et al. | 716/122 |
| 2013/0207199 A1 * | 8/2013 | Becker et al. | 257/369 |
| 2014/0258961 A1 | 9/2014 | Ke et al. | |

FOREIGN PATENT DOCUMENTS

| | | | |
|---|---|---|---|
| JP | 2006-179816 A | 6/2006 | |
| JP | 2007-027290 A | 6/2011 | |
| JP | 2012-243791 A | 10/2012 | |

* cited by examiner

*Primary Examiner* — Mohammed Alam
(74) *Attorney, Agent, or Firm* — Slater & Matsil, L.L.P.

(57) ABSTRACT

A method embodiment includes identifying, by a processor, an empty region in an integrated circuit (IC) layout, wherein the empty region is a region not including any active fins. The method further includes providing a standard dummy fin cell and forming an expanded dummy fin cell. The standard dummy fin cell includes a plurality of partitions. The expanded dummy fin cell is larger than the standard dummy fin cell, and the expanded dummy fin cell includes integer multiples of each of the plurality of partitions. The empty region is filled with a plurality of dummy fin cells, wherein the plurality of dummy fin cells includes the expanded dummy fin cell. The plurality of dummy fin cells is implemented in an IC.

20 Claims, 26 Drawing Sheets

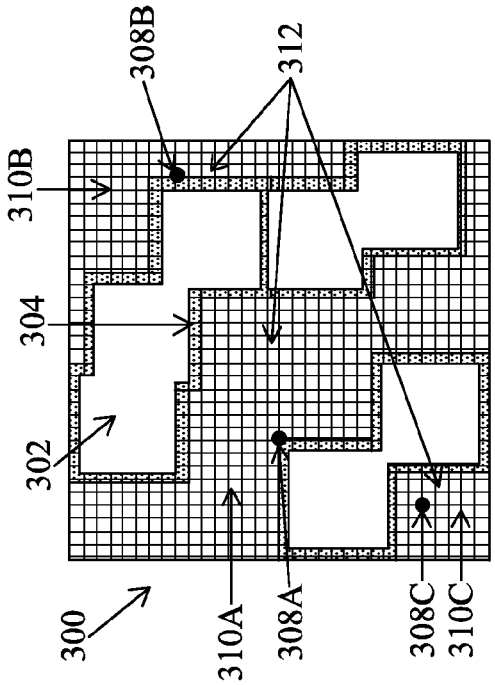
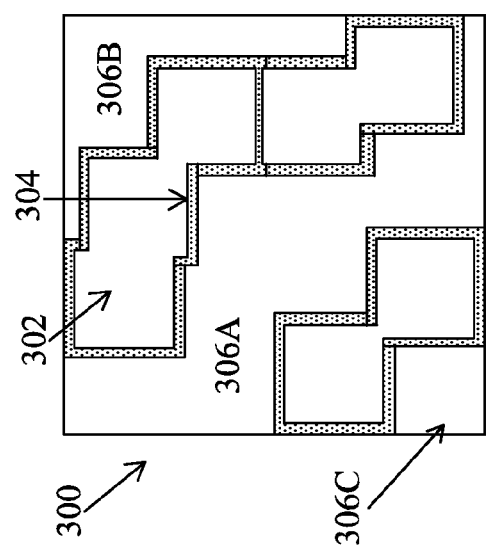
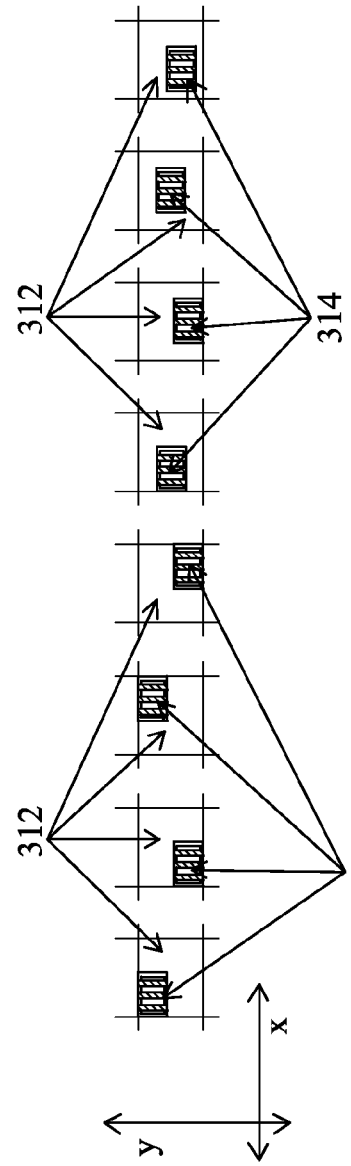
Fig. 2A
Fig. 2B
Fig. 2C

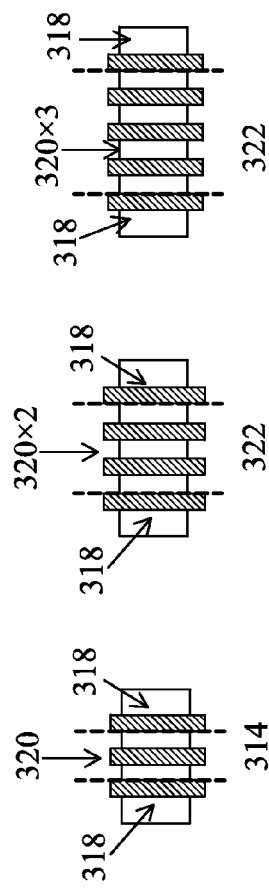
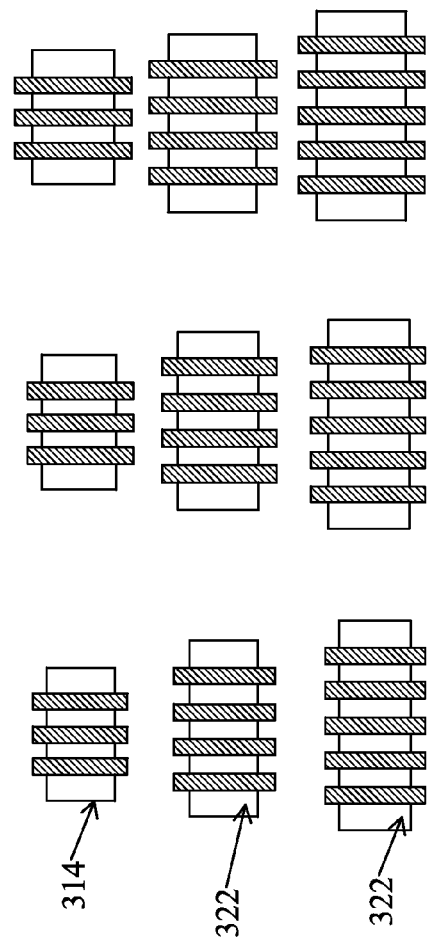
Fig. 2E
Fig. 2F

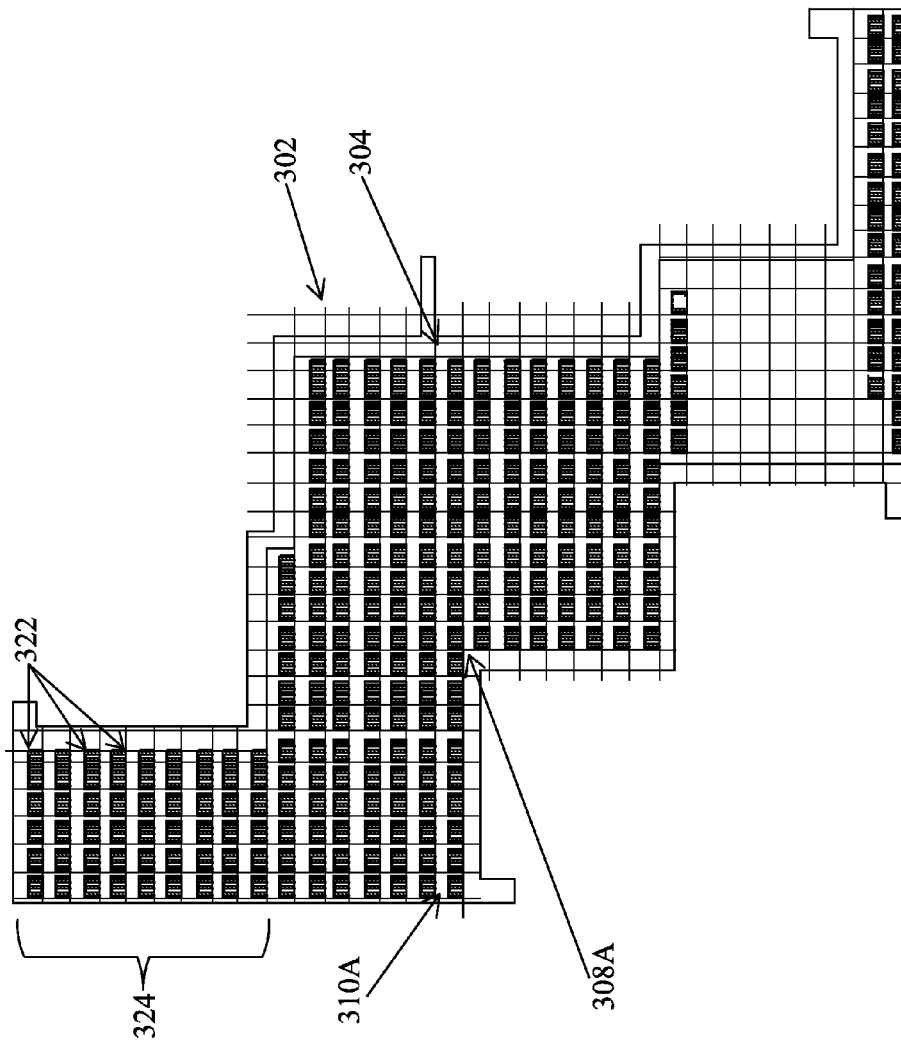

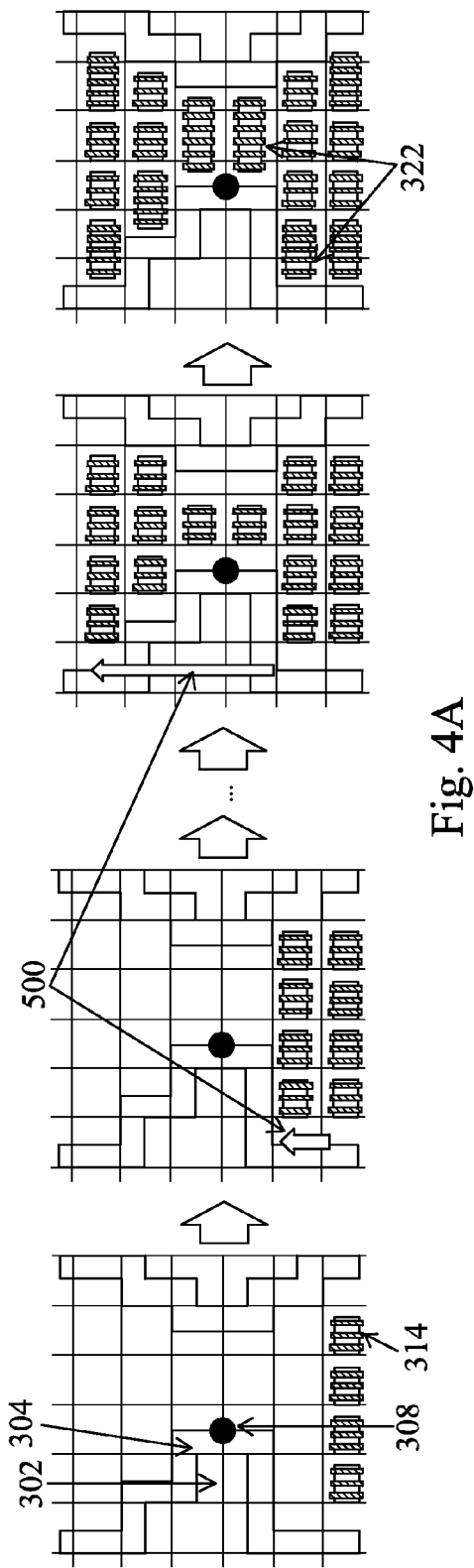
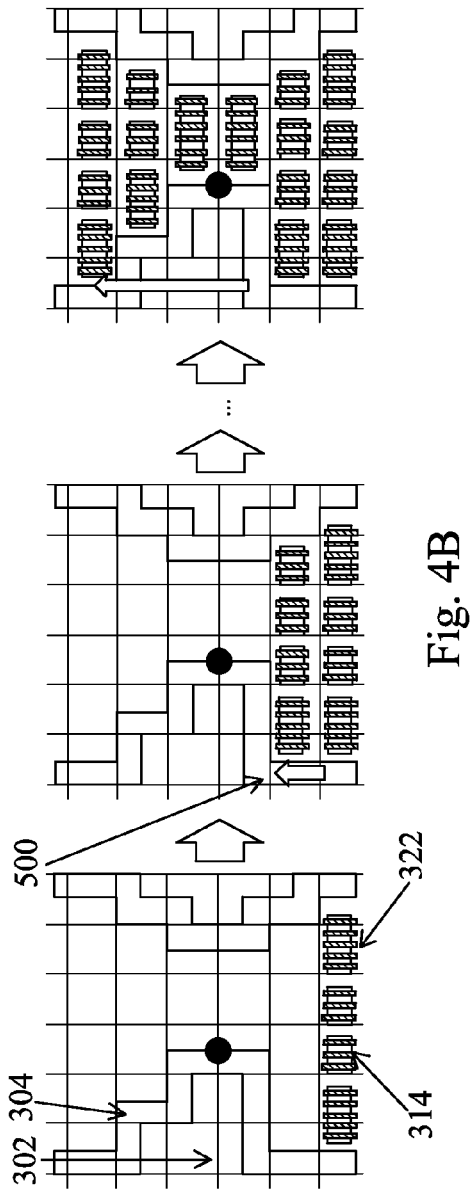
Fig. 4A
Fig. 4B

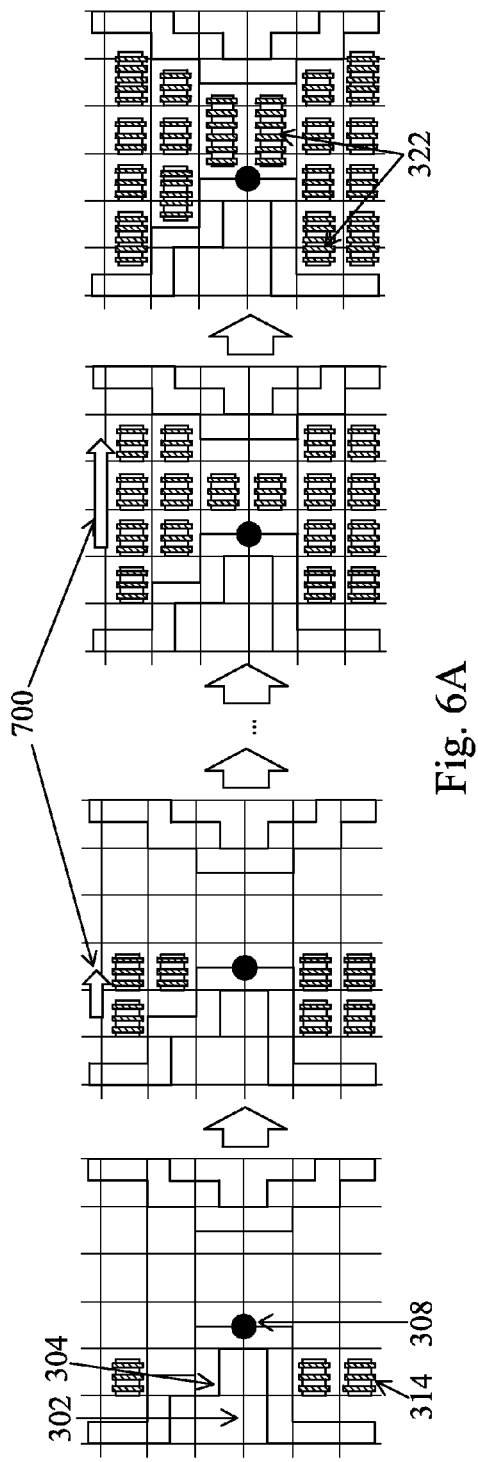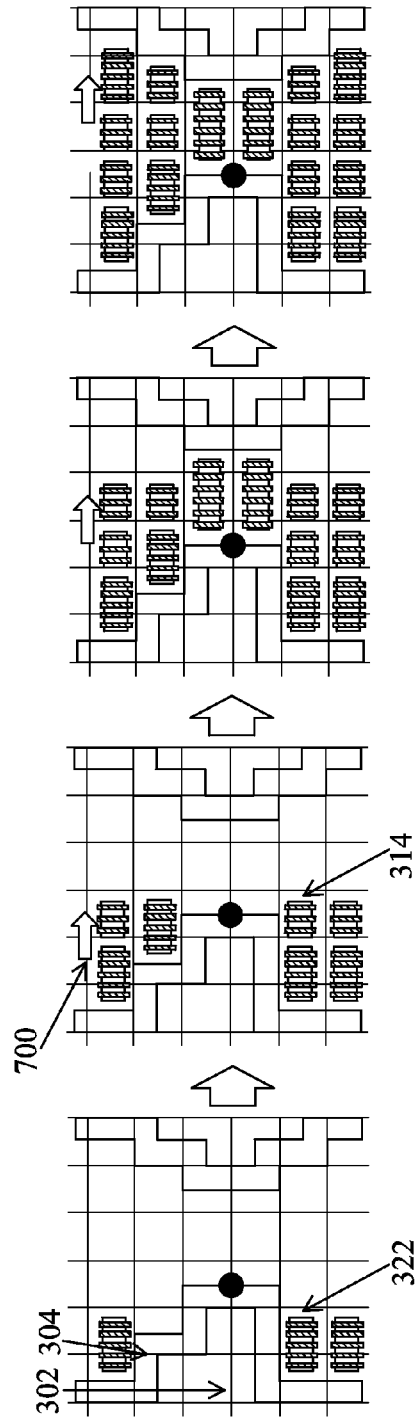
Fig. 6A
Fig. 6B

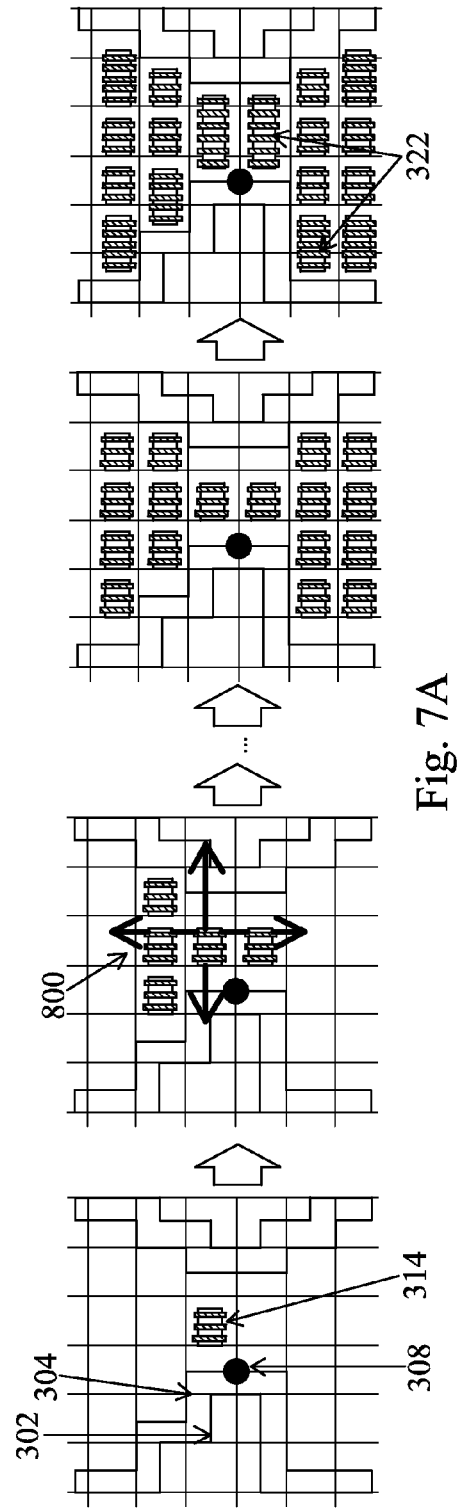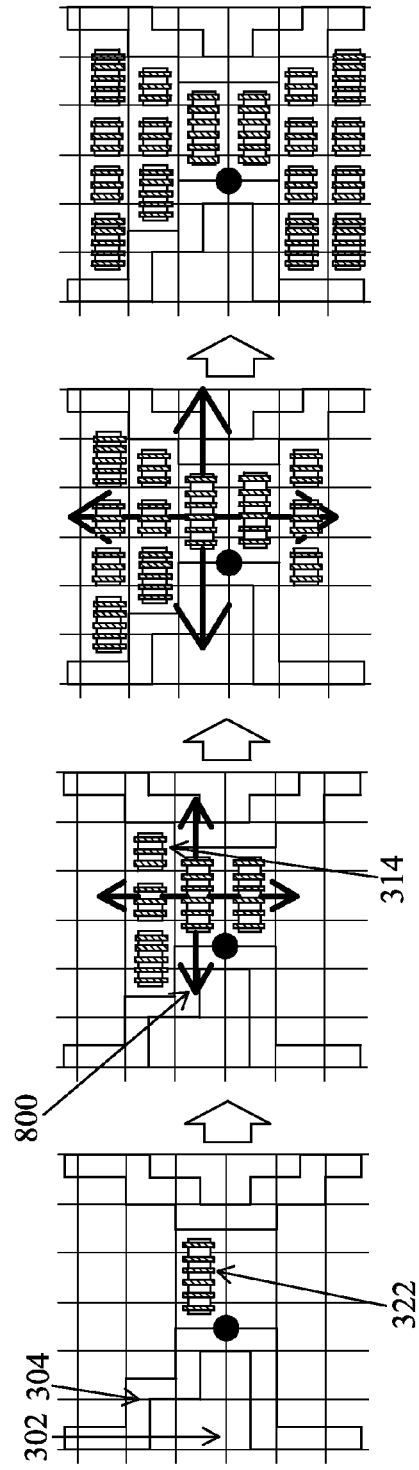

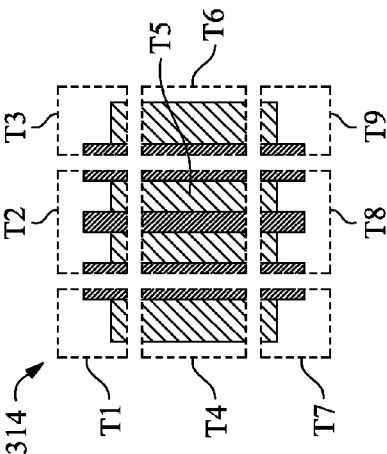
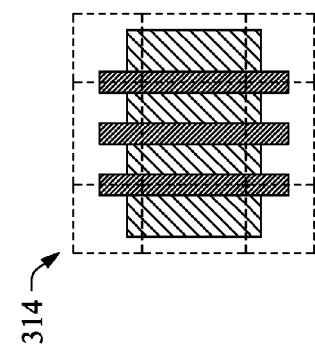
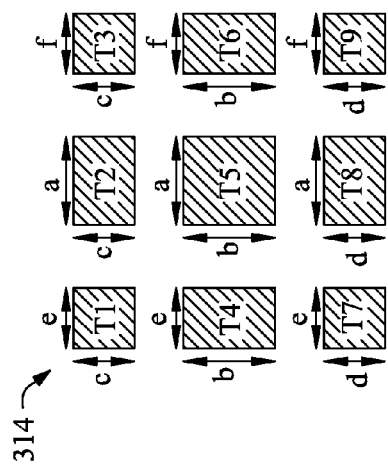
Fig. 10A
Fig. 10B

|   | a | b | c | d | e | f |
|---|---|---|---|---|---|---|
| a | 1 | 1 | 1 | 1 | 1 | 1 |
| b | 1 | 1 | 1 | 1 | 1 | 1 |
| c | 1 | 1 | 1 | 1 | 1 | 1 |
| d | 1 | 1 | 1 | 1 | 1 | 1 |
| e | 1 | 1 | 1 | 1 | 1 | 1 |
| f | 1 | 1 | 1 | 1 | 1 | 1 |

1200A →

⇒ 314A

| T1 | T2 | T3 |
|----|----|----|
| T4 | T5 | T6 |
| T7 | T8 | T9 |

Fig. 12B

|   | a   | b   | c   | d   | e   | f   |
|---|-----|-----|-----|-----|-----|-----|
| a | 1   | 2   | 3   | 5/2 | 2   | 3/2 |
| b | 1/2 | 1   | 3/2 | 5/4 | 1   | 3/4 |
| c | 1/3 | 2/3 | 1   | 5/6 | 2/3 | 1/2 |
| d | 2/5 | 4/5 | 6/5 | 1   | 4/5 | 3/5 |
| e | 1/2 | 1   | 3/2 | 5/4 | 1   | 3/4 |
| f | 2/3 | 4/3 | 2   | 5/3 | 4/3 | 1   |

1200B →

⇒ 314B

| T1 | T2 | T3 |
|----|----|----|
| T4 | T5 | T6 |
| T7 | T8 | T9 |

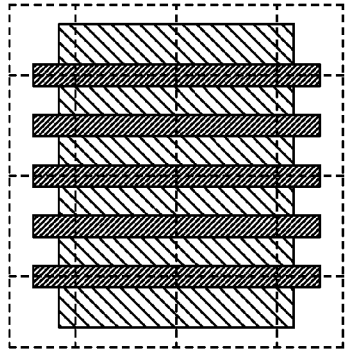
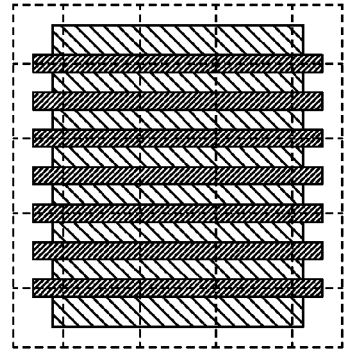
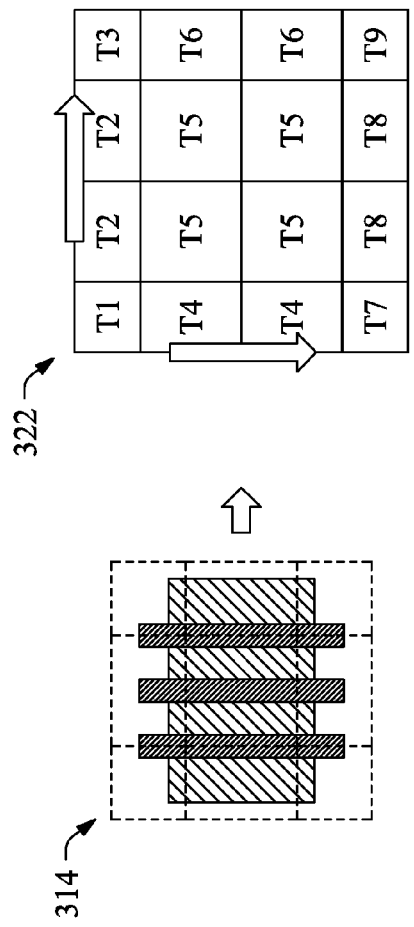
Fig. 13A
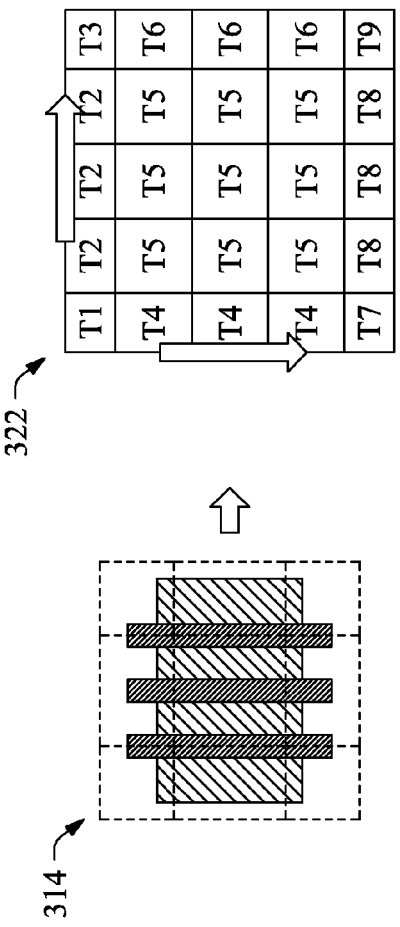
Fig. 13B

STRETCH DUMMY CELL INSERTION IN FINFET PROCESS

This application is a continuation-in-part of application Ser. No. 13/833,958, filed on Mar. 15, 2013, which claims the benefit of U.S. Provisional Application Ser. No. 61/776,457, filed on Mar. 11, 2013, entitled "Stretch Dummy Cell Insertion in FinFET Process," which applications are hereby incorporated herein by reference.

BACKGROUND

With the increasing down-scaling of integrated circuits (IC) and increasingly demanding requirements to the speed of ICs, transistors need to have higher drive currents with increasingly smaller dimensions. Fin field-effect transistors (FinFET) were thus developed. In a typical finFET, portions of a substrate are etched away to create a vertical fin structure. This vertical fin structure is used to form source/drain regions in the lateral direction, forming a channel region in the fin. A gate is formed over the fin in the vertical direction forming a finFET.

In a typical IC finFET layout, a fin array (i.e., a group of fins) may be situated next to an empty region. Empty regions refer to portions of an IC device layer without any fins or other active components. The presence of empty regions near a fin array may create problems in subsequent process steps and even lead to process failures. For example, after fins are formed, photolithography techniques may be used to form other features in the IC (e.g., a gate). When a photo resist layer is placed over a fin array and an empty region, the photo resist may have uneven topography.

An uneven photo resist layer creates issues with focus during the photolithography process and may cause process failures. These issues may be particularly detrimental on the boundaries of the fin array because it impedes the formation of other features over the fin array. Therefore, it is desirable to minimize the presence of empty regions in an IC near a fin array.

BRIEF DESCRIPTION OF THE DRAWINGS

For a more complete understanding of the present embodiments, and the advantages thereof, reference is now made to the following descriptions taken in conjunction with the accompanying drawings, in which:

FIGS. 2A-2H illustrate various intermediate stages of forming a finFET layout in accordance with various embodiments;

FIGS. 3A-8B illustrate various alternative intermediate stages of forming a finFET layout in accordance with various embodiments;

FIGS. 10A-10B illustrate partitioning of dummy fin cells in accordance with various embodiments;

FIGS. 11A-11F illustrate design rule limitations in accordance with various embodiments;

FIGS. 12A-12B illustrate example dummy fin cells in accordance with various embodiments;

FIGS. 13A-13D illustrate expanded dummy fin cells in accordance with various embodiments;

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely a stretch dummy cell insertion process in finFETs. Other embodiments may also be applied, however, to other dummy cell insertion processes in non-finFET integrated circuits (ICs).

Figure 1B:
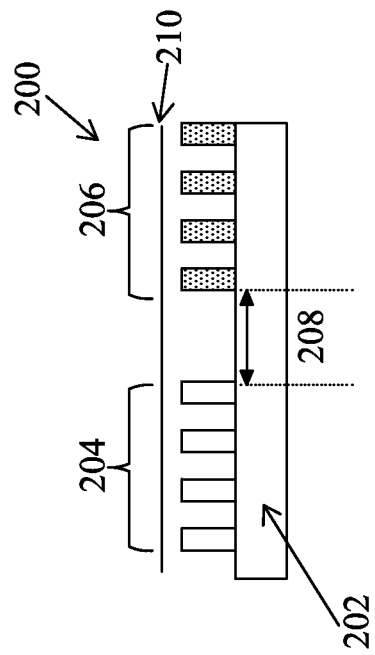
FIGS. 1A-1D illustrate a portion of an integrated circuit (IC) including a finFET in accordance with various embodiments.
Figure 1A:
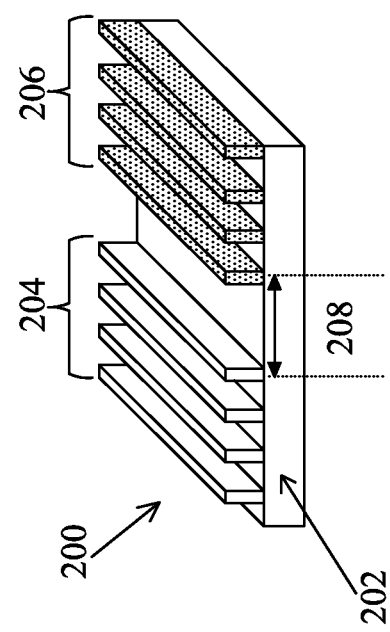
Figure 1C:
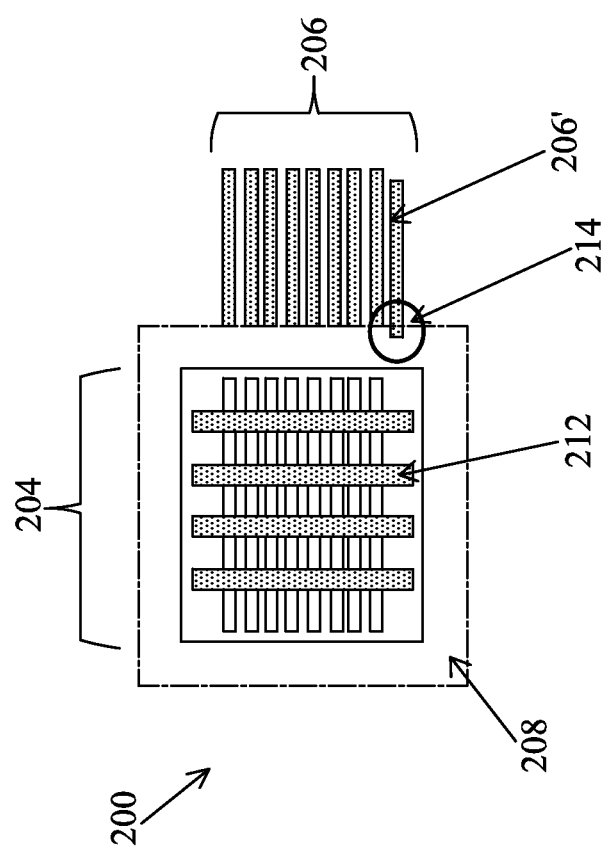
Figure 1D:
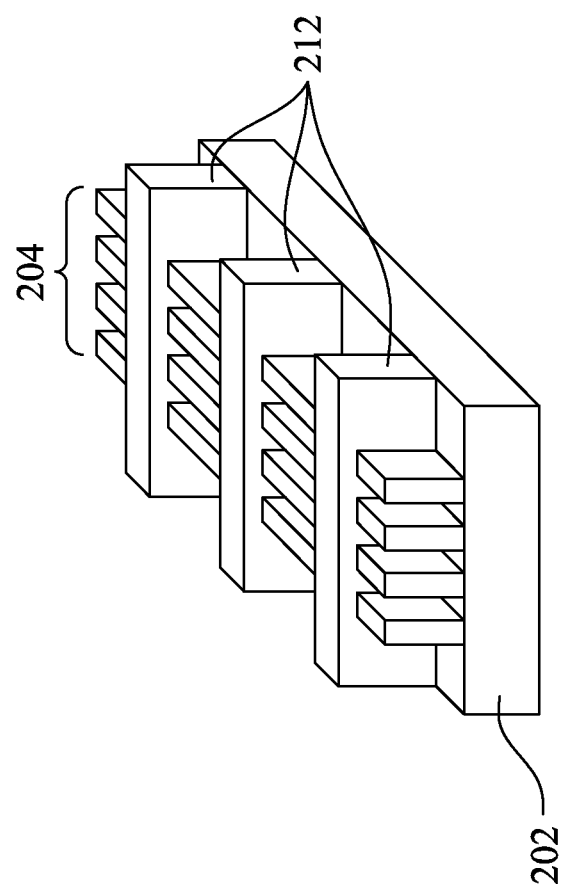

FIGS. 1A-1D illustrate a portion of an IC 200 in accordance with various embodiments. IC 200 includes a substrate 202, a fin array 204, and a plurality of dummy fins 206. Dummy fins 206 fill an otherwise empty region near fin array 204. As shown in FIG. 1B, the presence of dummy fins 206 allows for a top surface 210 of a photo resist layer to have an even topography. Dummy fins 206 are referred to as "dummy" because they are included for process purposes and are not included to form devices. For example, FIG. 1C shows as top-down view of IC 200 where gates 212 are formed over fin array 204 in contrast to dummy fins 206, which may or may not have gates 212 formed thereon. Furthermore, interconnect structures (not shown), such as conductive lines and vias, may be formed over fin array 204/gates 212 to electrically connect various finFETs to form functional circuits in IC 200. In contrast, dummy fins 206 may not be used to form functional circuits. FIG. 1D illustrates a perspective view of fin array 204 and gates 212. Gates 212 and fin array 204 are formed in substantially non-parallel (e.g., perpendicular) directions. Portions of fin array 204 covered by gates 212 may form various channel regions, and source drain regions may be formed in fins 204 on either side of each channel region. In embodiments where gates are formed over dummy fins 206, a substantially similar configuration as that shown in FIG. 1D may be used. Furthermore, while FIGS. 1C and 1D illustrate a particular number of fins in fin array 204, dummy fins 206, and gates 212, any number of such features may be formed depending on IC design.

In order to ensure dummy fins 206 do not interfere with the operation of fin array 204, dummy fins 206 are separated from fin array 204 by a minimum spacing 208. The dimensions of minimum spacing 208 may vary from one IC to next depending on the properties of the particular devices in the IC. In designing the layout for IC 200, dummy fins 206 should not be placed within minimum spacing 208 (e.g., layouts including area 214 in FIG. 2C should be avoided).

Figure 2D:
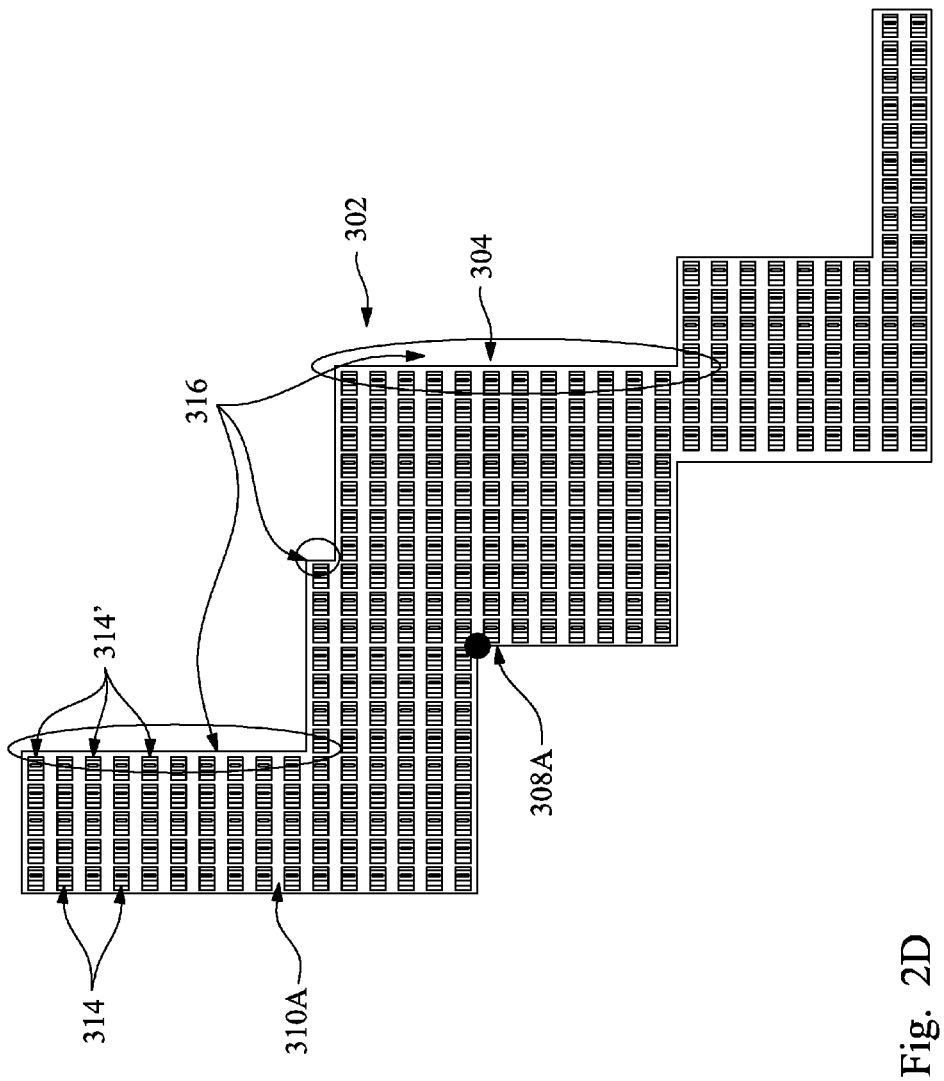

FIGS. 2A-2G illustrate top views of intermediate stages in laying out dummy fins in accordance with various embodiments. In FIG. 2A, a top-view of a portion of an IC layout 300 is shown. IC layout 300 includes active areas 302 containing active fin arrays having a minimum spacing constraint as indicated by border 304. The dimensions and placements of active areas 302 and border 304 may vary from one IC layout to the next. Regions 306 (labeled regions 306A, 306B, and 306C) are identified as empty regions that may be minimized through the insertion of dummy fins. Dummy fins are inserted into regions 306 without crossing border 304.

In FIG. 2B, starting points 308A-308C are determined for regions 306A-306C respectively. The placement of starting points 308A-308C may be arbitrarily selected within each region. Starting points 308A-308C are selected so that grid maps 310A-310C may be laid out in regions 306A-306C respectively. Grid maps 310A-310C include a plurality of aligned and equally-sized grids 312 that facilitate the orderly placement of dummy fins within regions 306. Grid maps 310A-310C are laid out to cover regions 306A-306C completely and may extend over border 304 and active areas 302. Grid maps 310A-310C are aligned to starting points 308A-308C respectively. Because starting points 308A-308C may be arbitrarily placed, grid maps 310A-310C may or may not be aligned with each other.

Figure 3A:
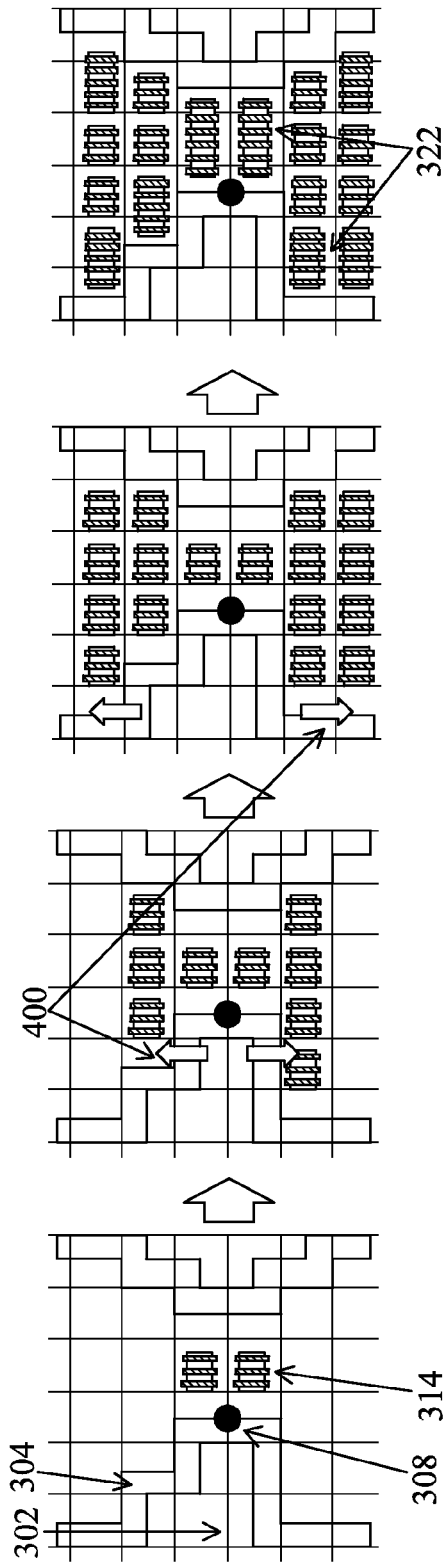

FIG. 2C illustrates various alternative configurations for placing dummy fin cells 314 in grids 312. Each dummy fin cell 314 represents a dummy fin structure and is defined to be a minimum unit of dummy fin insertion in the layout process. Each grid 312 may include one dummy fin cell 314. Dummy fin cells 314 may be placed at any location within grids 312. For example, various possible placements of dummy fin cells 314 in grids 312 are shown in FIG. 3C. However, within a grid map (e.g., grid map 310A), the placement of dummy fin cells 314 in grids 312 is constant. That is, within a grid map, dummy fin cells 314 are placed in the same relative location of grids 312 respectively. By keeping the placement of dummy fin cells 314 constant within a grid map, the orderly placement of various features may be maintained.

Furthermore, FIG. 2C shows grids 312 being larger than dummy fin cells 314. The sizing of grids 312 is configurable and may be related to the size of dummy fin cells 314. For example, the size of grids 312 may be selected to maintain a desired pitch in the x and/or y-direction. Pitch refers to the distance between an edge of a dummy fin cell and a corresponding edge of an adjacent dummy fin cell. For example, an x-direction pitch could be the distance between the left-most edge of a dummy fin cell and the left-most edge of an adjacent dummy fin cell in a same row. As another example, a y-direction pitch could be the distance between the top-most edge of a dummy fin cell and the top-most edge of an adjacent dummy fin cell in a same column. Therefore, grids 312 may be sized to ensure a desired, uniform spacing between dummy fin cells 314 in both the x and y direction.

FIG. 2D illustrates filling region 306A, having grid map 310A, with dummy fin cells 314. A dummy fin cell 314 is placed in as many grids 312 as possible without violating the minimum spacing constraint. However, boundary grids 312' (e.g., grids 312 in highlighted regions 316) extend over border 304. Placing dummy fin cells in these boundary grids 312' will violate the minimum spacing constraint. Therefore boundary grids 312' may not be filled with dummy fin cells 314. Alternatively, all grids 312 (including boundary grids 312') may be first filled with dummy fin cells 314. Subsequently, dummy fin cells 314 that violate the minimum spacing constraint may be removed.

In order to further minimize empty space in region 306, dummy fin cells 314' (i.e., the dummy fin cells adjacent to boundary grids 312') may be extended. FIG. 2E illustrates the expansion of dummy fin cells 314' in accordance with various embodiments. Dummy fin cell 314 includes edge portions 318 and middle portion 320. In expanded dummy fin cell 322, edge portions 318 remain constant. However, middle portion 320 may be multiplied to create expanded dummy fin cell 322 (e.g., FIG. 2E shows middle portion 320 being doubled and tripled). An advantage to this approach is that the size of expanded dummy fin cell 322 is derived from and related to the size of dummy fin cell 314. Therefore, the file size of an IC layout file (e.g., a GDS file) corresponding to IC layout 300 may be comparatively small. In contrast, if the size of expanded dummy fin cell 322 is unrelated to dummy fin cell 314, the file size of the IC layout file corresponding to IC layout 300 may be larger.

Additionally, as illustrated by FIG. 2F, dummy fin cells may be expanded in the vertical direction. Like horizontal expansion, vertical expansion may also be may be achieved by multiplying the height of dummy fin cell 314 (or a horizontally expanded dummy fin cell 322) by a constant. Therefore, a vertically expanded dummy fin cell may also be a multiple of a dummy fin cell 314, and the IC layout file size may be reduced.

Figure 2G:
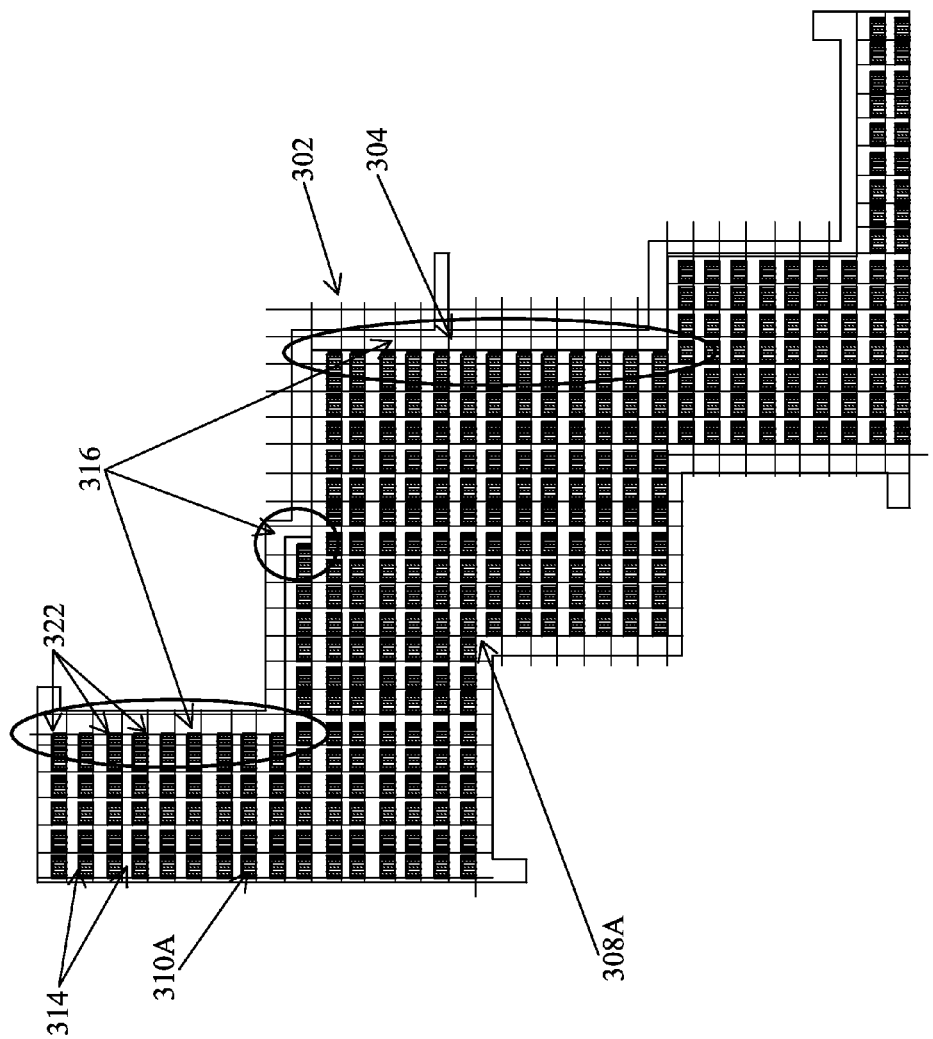

FIG. 2G illustrates the replacement of dummy fin cells 314' bordering boundary grids 312' with expanded dummy fin cells 322. Expanded dummy fin cells 322 have the same placement as dummy fin cells 314 in grids 312; however, expanded dummy fin cells extend into boundary grids 312'. Therefore, an expanded dummy fin cell may occupy multiple grids. Empty space in regions 306B is thus minimized. Regions 306B and 306C may be filled in a similar manner as region 306A.

FIG. 2H illustrates an alternative embodiment wherein one expanded dummy fin cell 322 occupies an entire roll in region 324. All the dummy fin cells 314 in a same row of region 324 have been replaced with one expanded dummy fin cell 322. Therefore, horizontal spacing (i.e., the pitch in the x-direction) between dummy fin cells 314 is eliminated. The layout in FIG. 3G may be used to increase the density of dummy cells in a region, for example, to meet design rule density limitations. This approach may also be used in non-finFET layout processes to meet design rule density limitations for other dummy features.

In subsequent process steps, IC layout 300 having active areas 302, dummy fin cells 314, and/or expanded dummy fin cells 322 may be implemented in one or more physical ICs. For example, the physical IC may form active fin arrays 204 and gates 212 in areas corresponding to active areas 302 and dummy fins 206 in areas corresponding to dummy fin cells 314. Gates 212 may or may not be over on dummy fins 206. For example, in some embodiments, various active fin arrays 204 and dummy fins 206 may have a similar physical shape as illustrated by FIG. 1A, and gates 212 may be formed over such active fin arrays 204 and/or dummy fins 206 in a similar manner as illustrated by FIG. 1D.

The formation of various physical features, such as fins, of the IC may be done using any suitable process. For example, referring back to FIG. 1A, there is shown a substrate 202 having fins 204 and 206 extending therefrom. In some embodiments, substrate 202 comprises a crystalline silicon substrate (e.g., wafer), although other suitable elemental semiconductor, such as a suitable compound semiconductor (e.g., gallium arsenide, silicon carbide, indium arsenide, indium phosphide, or the like), or a suitable alloy semiconductor (e.g., silicon germanium carbide, gallium arsenic phosphide, or gallium indium phosphide), or the like, may also be used. Further, substrate 202 may include an epitaxial layer (epi-layer), may be strained for performance enhancement, and/or may include a silicon-on-insulator (SOI) structure.

Substrate 202 may be patterned using, for example, photolithography techniques. For example, a mask layer, such as a pad oxide layer (not shown) and an overlying pad nitride layer (not shown), is formed over the substrate 202. The pad oxides layer may be a thin film comprising silicon oxide formed, for example, using a thermal oxidation process. The pad oxide layer may act as an adhesion layer between the substrate 202 and the overlying pad nitride layer and may act as an etch stop layer for etching the pad nitride layer. In an embodiment, the pad nitride layer is formed of silicon nitride, for example, using low-pressure chemical vapor deposition (LPCVD) or plasma enhanced chemical vapor deposition (PECVD).

The mask layer may be patterned using photolithography techniques. Generally, photolithography techniques utilize a photoresist material (not shown) that is deposited, irradiated (exposed), and developed to remove a portion of the photoresist material. The remaining photoresist material protects the underlying material, such as the mask layer in this example, from subsequent processing steps, such as etching. The patterned mask is subsequently used to pattern exposed portions of the substrate 102 to form trenches, thereby defining fins 204 and 206 between adjacent trenches as illustrated in FIG. 1A. Alternatively, fins 204 and 206 may also be formed by depositing an oxide layer (e.g., silicon oxide) over substrate 102, patterning the oxide layer, and epitaxially growing fins. Subsequently, one or more gates 212 may be formed across active fins 204 and/or dummy fins 206 using any suitable process.

Figure 3B:
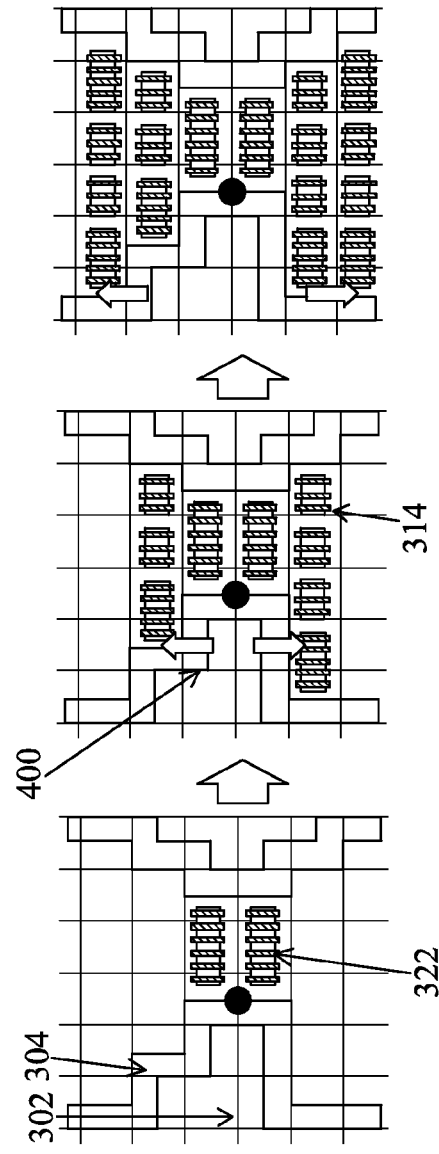

The placement and expansion of dummy fin cells 314 into regions 306 may be done in in any order. FIGS. 3A-8B illustrate various alternative methods of placing and expanding dummy fin cells 314. For example, in FIG. 3A, dummy fin cells 314 are first placed row by row from starting point 308. Alternatively, dummy fin cells 314 may be placed starting from any other location. The rows above and beneath starting point 308 are then filled in bi-directionally as indicated by arrows 400. After all the dummy fin cells 314 are placed into grids, certain dummy fin cells (i.e., those near border 304) may be replaced with expanded dummy fin cells 322 to further minimize empty space. Alternatively, as shown by FIG. 3B, appropriate dummy fin cells may be placed into a row and replaced with expanded dummy fin cells 322 before the next row of grids is filled. In still other alternatives, an expanded dummy fin cell 322 may be placed in a row directly without first placing a dummy fin cell 314.

FIGS. 4A-4B shows an alternative method wherein dummy fin cells 314 are still placed row by row. However, rows of grids are filled uni-directionally as indicated by arrow 500. FIG. 4A shows region 306 being completely filled with dummy fin cells 314 before they are expanded. FIG. 4B illustrates certain dummy fin cells 314 in a row being expanded before a next row is filled. In still other alternatives, an expanded dummy fin cell 322 may be placed in a row directly without first placing a dummy fin cell 314.

Figure 5A:
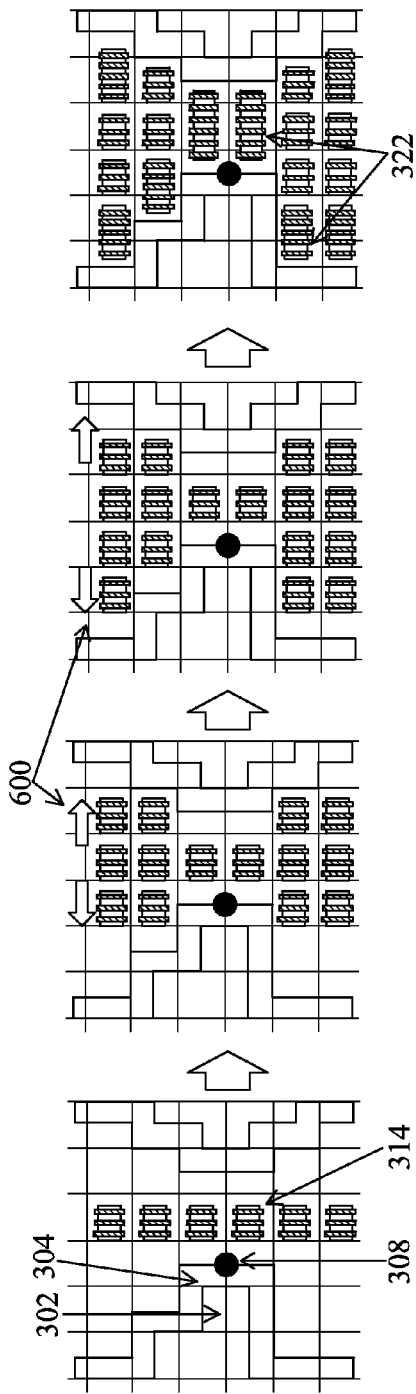
Figure 5B:
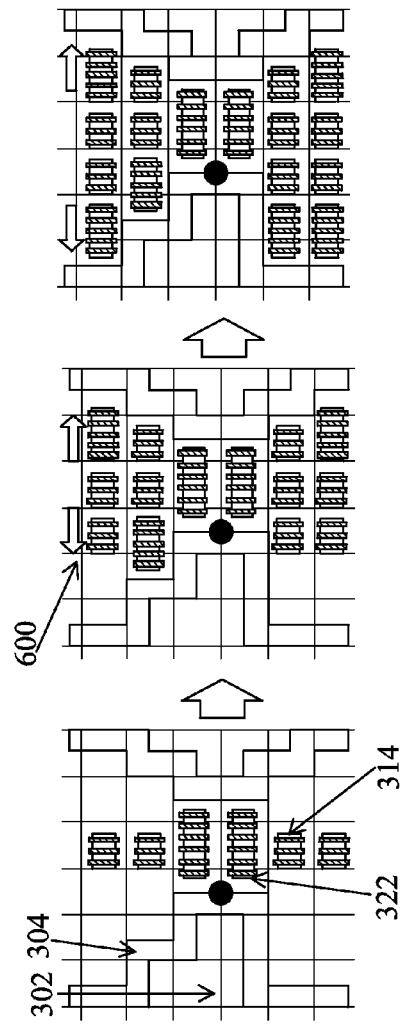

FIGS. 5A-5B illustrate yet another alternative wherein dummy fin cells 314 are placed column by column. Columns in region 306 are subsequently filled bi-directionally as indicated by arrows 600. Dummy fin cells 314 may first fill a region completely before they are expanded (as shown by FIG. 5A), or appropriate dummy fin cells 314 in a column may be expanded before a next column is filled (as shown by FIG. 5B). In still other alternatives, an expanded dummy fin cell 322 may be placed in a column directly without first placing a dummy fin cell 314.

FIGS. 6A and 6B illustrate the filling of region 306 with dummy fin cells 314 column by column. However, columns are filled uni-directionally from left to right as indicated by arrow 700. Alternatively, columns may also be filled in a right to left direction. Again, expansion of appropriate dummy fin cells 314 may be done after all grids are filled (FIG. 6A) or after each column is filled (FIG. 6B). In still other alternatives, an expanded dummy fin cell 322 may be placed in a column directly without first placing a dummy fin cell 314.

FIGS. 7A and 7B illustrate filling grids in region 306 in both the vertical and horizontal directions as indicated by arrows 800 (i.e., multi-directionally). FIG. 7A shows expansion of dummy fin cells 314 after all grids are filled. FIG. 7B shows expansion of dummy fin cells 314 after each group of grids is filled. In still other alternatives, an expanded dummy fin cell 322 may be placed in a group of grids directly without first placing a dummy fin cell 314.

Figure 8A:
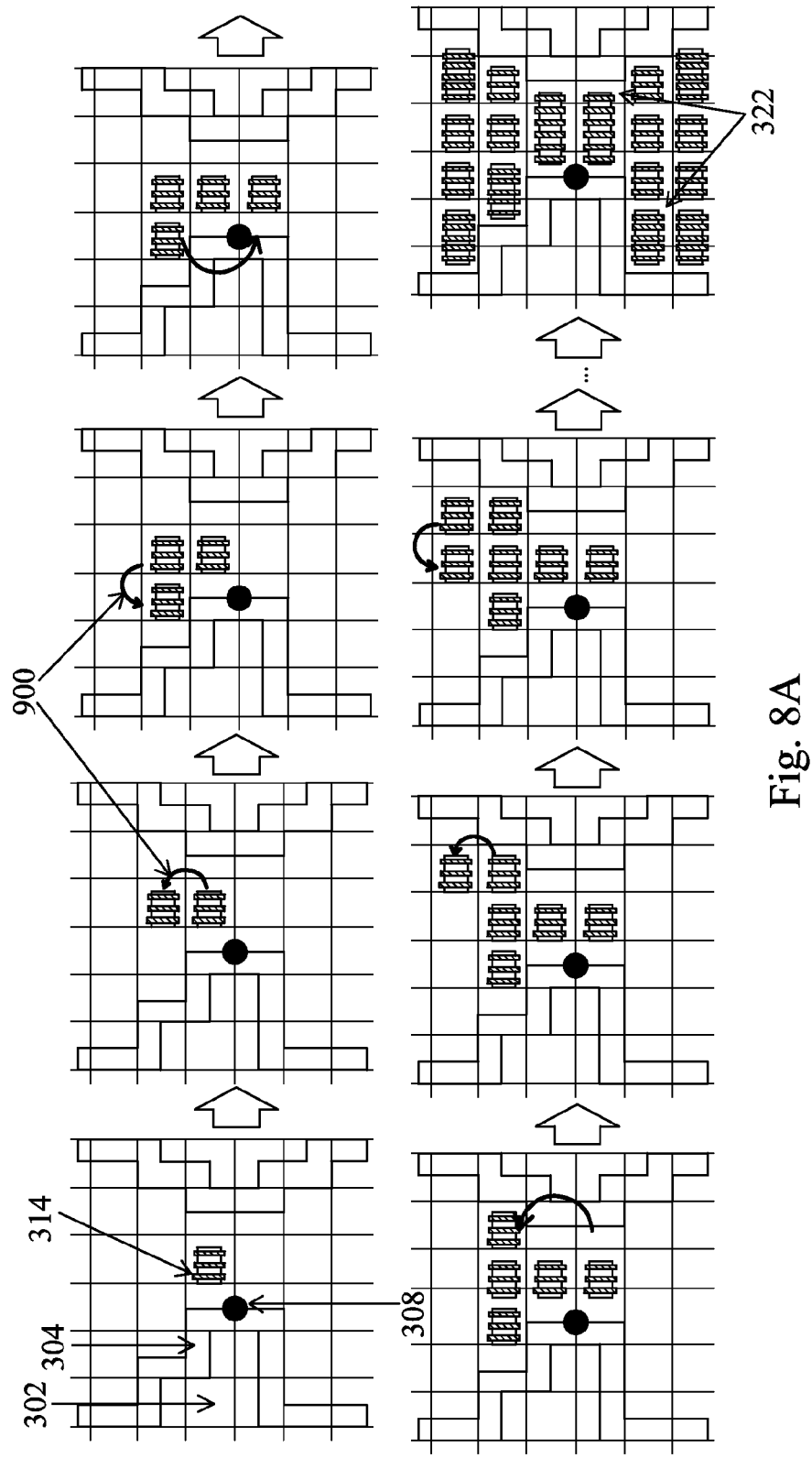
Figure 8B:
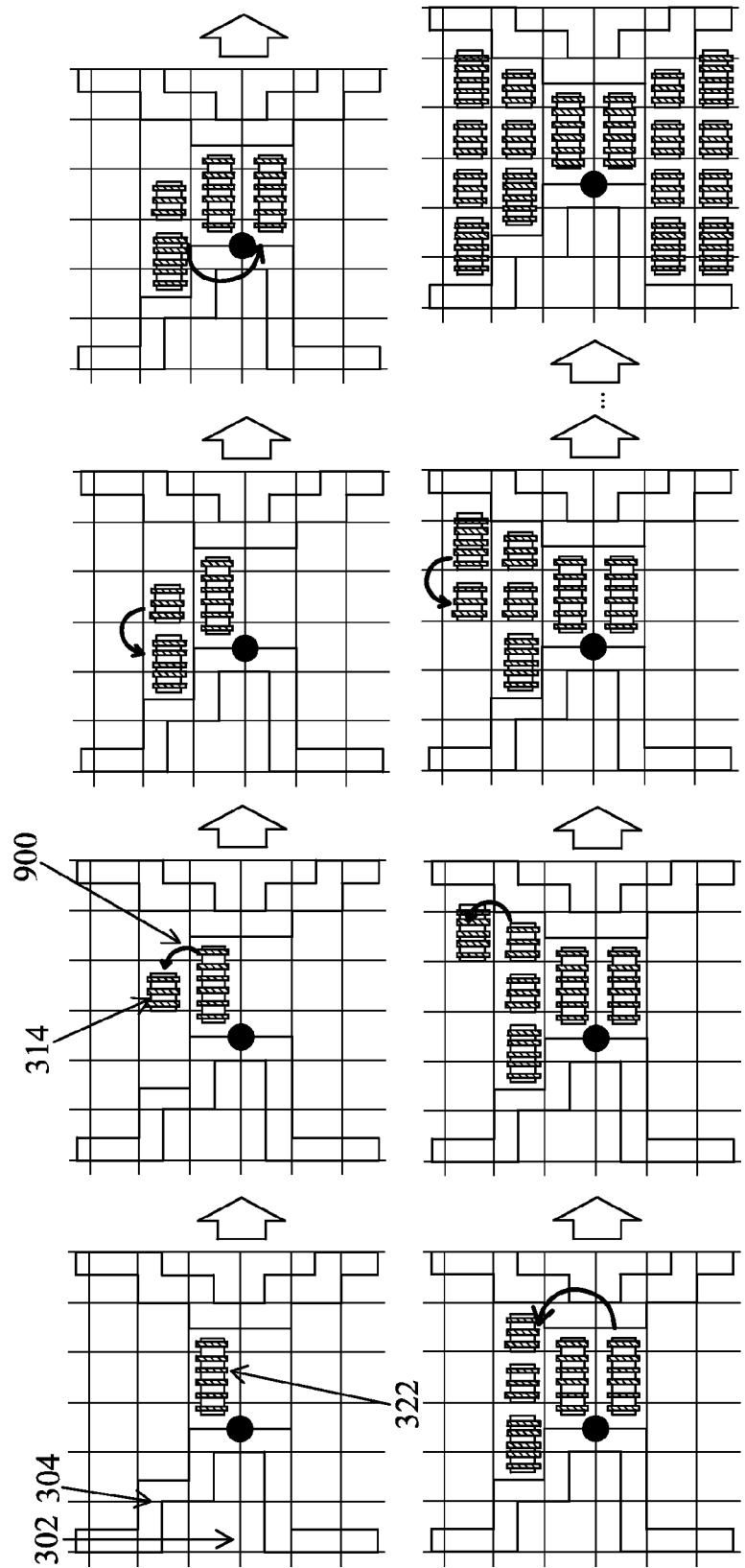
Figure 9:
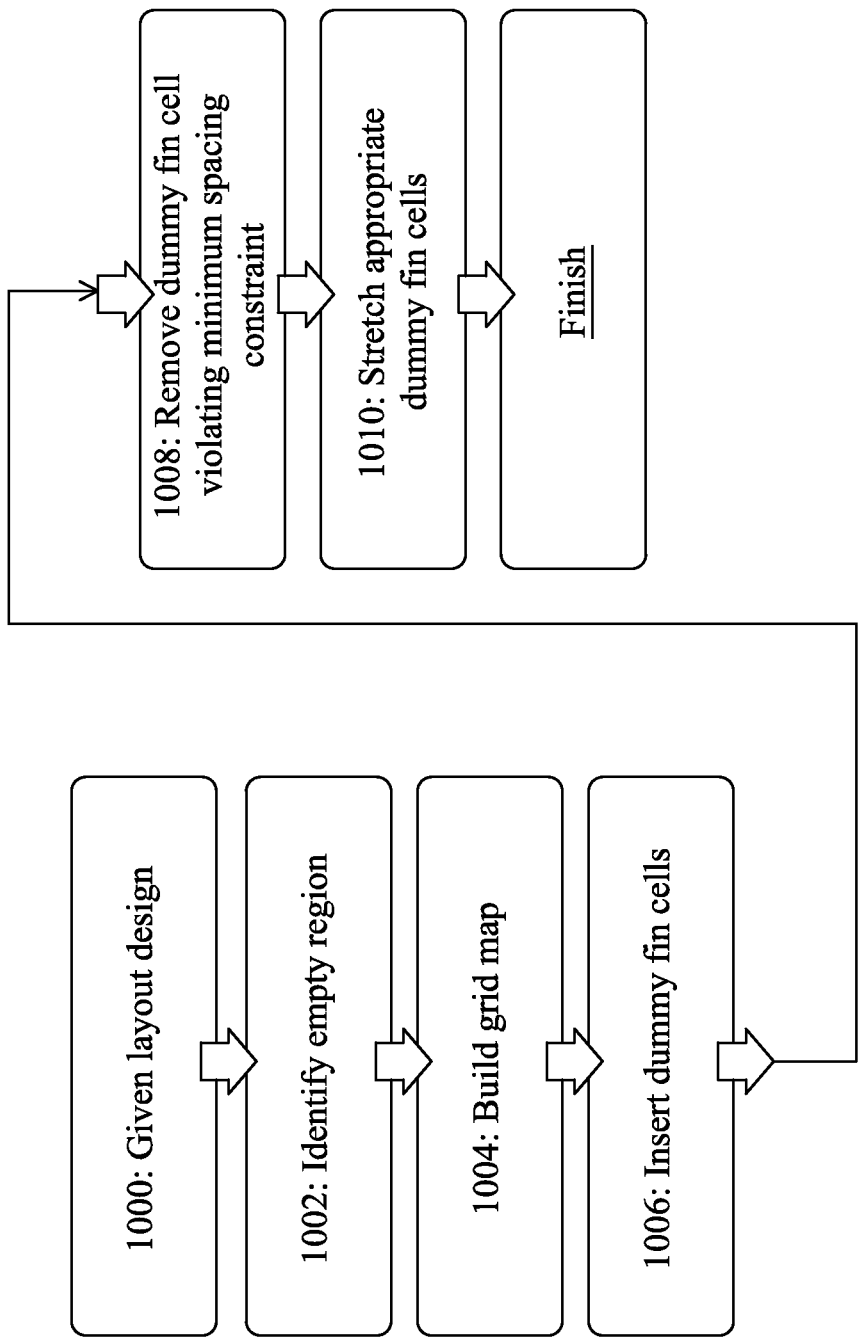
FIG. 9 is a flow diagram illustrating the steps of forming a finFET layout in accordance with various embodiments.

FIGS. 8A and 8B illustrate filling grids in region 306 in a counter-clockwise spiral direction indicated by arrow 900. Alternatively, region 306 may also be filled in a clockwise spiral direction. Expansion of dummy fin cells 314 may be performed after the entire map is filled (FIG. 9A) or after each grid is filled (FIG. 9B). In still other alternatives, an expanded dummy fin cell 322 may be placed in various grids directly without first placing a dummy fin cell 314. As shown by the various examples in FIGS. 4A-9B, the filling of grids and expansion of dummy fin cells in a region are not limited to any particular order of steps.

FIG. 9 is a flowchart illustrating steps of laying out dummy fin cells in an IC according to various embodiments. In step 1000, a design layout is given. The design layout may include active fin arrays and a minimum spacing constraint. The minimum spacing constraint is included so that dummy fins are spaced an appropriate distance away from active fin arrays so as to not interfere with IC functionality.

In step 1002, empty regions are identified. Empty regions are any regions outside the minimum spacing constraint that do not include any active fin arrays. These empty regions, if left unfilled, may cause problems in subsequent process steps. For example, empty regions near a fin array may lead to process failures in a photolithographic process.

In step 1004, grid maps are laid out over the empty regions. The grid maps include equally-sized, aligned grids. The grid maps amongst several regions may or may not be aligned with each other. The size of a grid may be related to the size of a dummy fin cell, and the size of a grid may be selected to maintain a desired pitch (i.e., spacing in either the lateral or vertical direction) between dummy cells. Furthermore, the grid map may fill an entire empty region and expand past the minimum spacing constraint.

In step 1006, each grid in an empty region is filled with a dummy fin cell. The filling of grids with dummy fin cells may be done in any order (e.g., any of the placement orders illustrated in FIGS. 3A-8B). Grids that cross into the minimum spacing constraint may be left empty. Alternatively, the grids that cross into the minimum spacing constraint may be filled as well. In step 1008, any dummy fin cells that violate the minimum spacing restraint are removed.

In step 1010, certain dummy fin cells may be stretched to further minimize any remaining gaps in the empty region. These remaining gaps may include grids that cross into the minimum spacing constraint. Alternatively, the remaining gaps may include spacing between dummy fin cells that should be eliminated to meet a design rule dummy fin cell density requirement. Dummy fin cells adjacent to these remaining empty regions may be stretched. Alternatively, dummy fin cells are stretched at various points while the grid map is being filled. Finally, in step 1012, the IC layout may be implemented in a physical IC. For example, dummy fin (e.g., dummy fins 206) may be formed in a pattern defined by dummy fin cells and expanded dummy fin cells in the IC layout.

FIGS. 10A-14D illustrate various block diagrams for expanding dummy fin cells in accordance with some alternative embodiments. A standard dummy fin cell is divided into logical partitions, and expanded dummy fin cells may be formed by combining integer multiples of the logical partitions. Such expanded dummy fin cells may be used to further minimize space and increase density in empty regions of an IC layout.

Referring to FIG. 10A, a standard dummy fin cell 314 may be divided into multiple, logical partitions. For example, in the illustrated embodiments, dummy fin cell 314 is divided into nine partitions T1 through T9 configured in a three partition by three partition rectangle. Dummy fin cell 314 may include corner partitions T1, T3, T7, and T9 disposed at top left, top right, bottom left, and bottom right corners, respectively. Dummy fin cells 314 may further include middle partitions T2 (e.g., disposed between corner partitions T1 and T3), T4 (e.g., disposed between corner partitions T1 and T7), T5 (e.g., disposed in a center of dummy fin cell 314), T8 (e.g., disposed between corner partitions T7 and T9), and T6 (e.g., disposed between corner partitions T3 and T9). The three partition by three partition rectangle of dummy fin cell 314 includes a top row (including partitions T1, T2, T3), a middle row (including partitions T4, T5, and T6), a bottom row (including partitions T7, T8, and T9), a left column (including partitions T1, T4, and T7), a middle column (including partitions T2, T5, and T8), and a right column (including partitions T3, T6, and T9).

As illustrated by FIG. 10B, each partition T1 through T9 may have horizontal and vertical dimensions. Partitions within a same row have a same vertical dimension while partitions in a same column have a same horizontal dimension. In the illustrated embodiment, partitions T1, T2, and T3 in the top row have a vertical dimension c, partitions T4, T5, and T6 in the middle row have a vertical dimension b, and partitions T7, T8, and T8 in the bottom row have a vertical dimension d. Furthermore, partitions T1, T4, and T7 in the left column have a horizontal dimension e, partitions T2, T5, and T8 in the middle column have a vertical dimension a, and partitions T3, T6, and T9 in the right column have a vertical dimension f.

Figures 11A, 11B, 11C, 11D:
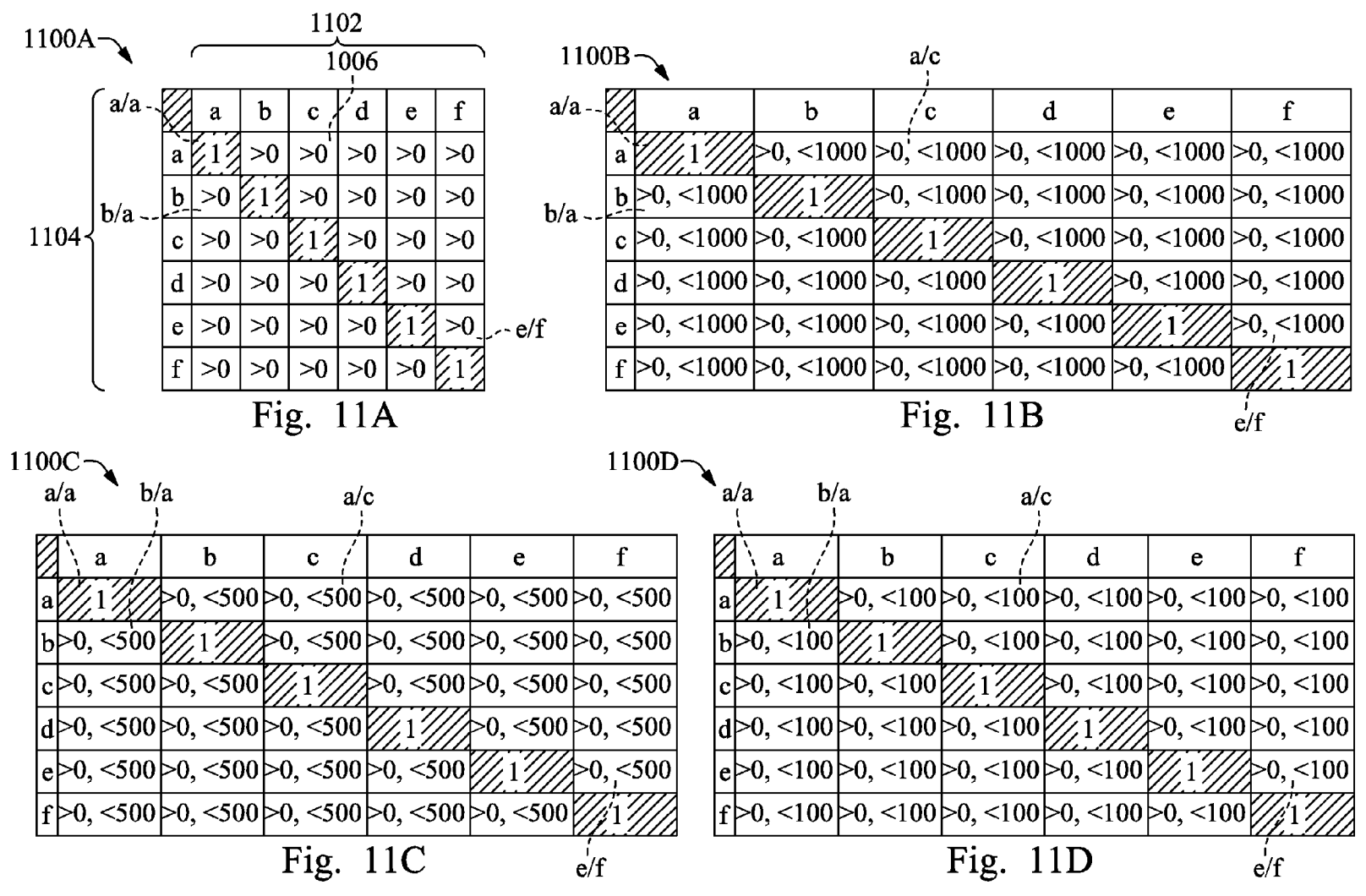
Figures 11E, 11F:
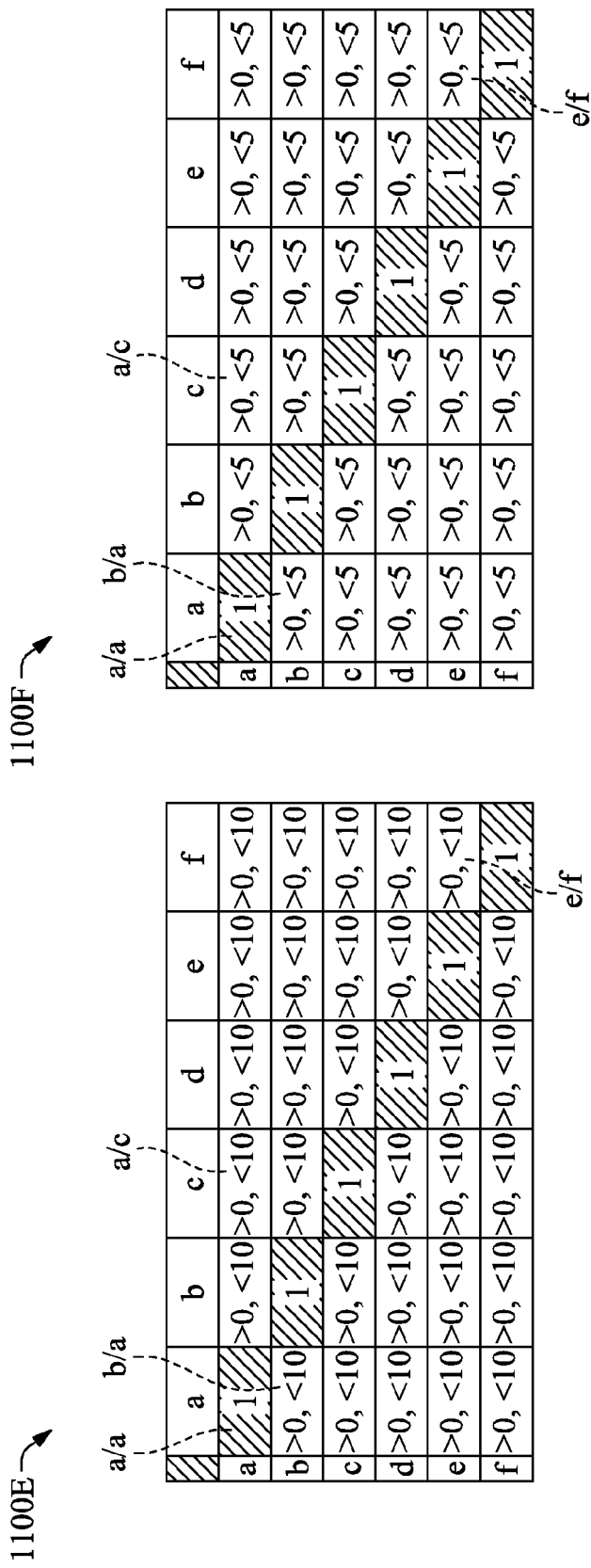

In various embodiments, the vertical dimensions c/b/d, horizontal dimensions e/a/f, and/or ratios between dimensions a through f of partitions T1 through T9 for a particular dummy fin cell 314 may or may not be the same. In some embodiments, the shape of partitions T1 through T9 (and thus, dummy fin cell 314) may be configured by altering the ratios of dimensions a through f. In some embodiments, design rule limitations may be placed to fix the ratios of various dimensions a through f within a certain range across multiple IC layouts (e.g., at a system level). For example, FIGS. 11A-11F illustrate example design rule limitation tables 1100 (labeled 1100A-1100F), which may be applied to multiple IC layout designs. Each cell in tables 1100 corresponds to a ratio of a dimension in a corresponding row 1102 to a dimension in a corresponding column 1104. For example, cell 1106 corresponds to a ratio of dimension a to dimension c. A ratio of any dimension to itself (e.g., dimension a to dimension a, dimension b to dimension b, dimension c to dimension c, and the like) is set as 1 as indicated by the cells across the diagonal of each table 1100. Table 1100A in FIG. 11A illustrates the most relaxed design rule limitations, as the ratios of any dimension a through f may be have value greater than zero. Other design rule limitations may also be applied. For example, FIG. 11B illustrates design rules in Table 1100B limiting ratios of dimensions a through f between the values of 0 and 1000, FIG. 11C illustrates design rules in Table 1100C limiting ratios of dimensions a through f between the values of 0 and 500, FIG. 11D illustrates design rules in Table 1100D limiting ratios of dimensions a through f between the values of 0 and 100, FIG. 11E illustrates design rules in Table 1100E limiting ratios of dimensions a through f between the values of 0 and 10, and FIG. 11F illustrates design rules in Table 1100F limiting ratios of dimensions a through f between the values of 0 and 5. The design rules given in FIGS. 11A and 11F are purely for the sake of example and are non-limiting. Furthermore, while illustrated tables 1000 limit each ratio within a same range per design rule, in other embodiments, the range of ratios may vary within a single design rule. For example, a ratio of dimension a to dimension b may be limited to being between the values of 0 and 10 while a ratio of dimension c to dimension f may be limited to being between the values of 0 and 5. By limiting the ratios of various dimensions a to f, flexibility and layout file size may be balanced for IC design as will be explained in greater detail in subsequent paragraphs.

The shape and dimensions of a standard dummy fin cell 314 (and corresponding dimensions of various partitions T1 through T9) may be fixed for a particular IC layout. For example, FIGS. 12A and 12B illustrate example configurations for standard dummy fin cells 314, which may be used in different IC layouts. FIG. 12A illustrates an example dummy fin cell 314A. The shape of dummy fin cell 314A may be configured by table 1200A, which sets the ratios of various dimensions a through f to 1 (e.g., dimension a equals dimension b equals dimension c, etc.). Thus, the shape of dummy fin cell 314A may be substantially square. Furthermore, the actual values of horizontal dimensions e, a, and f and vertical dimensions c, b, and d for dummy fin cell 314A may also be fixed. FIG. 12B illustrates another example dummy fin cell 314B. The shape of dummy fin cell 314B may be configured by table 1200B, which sets different ratios for various dimensions a through f. Thus, the shape of dummy fin cell 314A may not be square. Shape of various partitions T1 through T9 of dummy fin cell 314B may or may not be substantially square depending on ratios configured by table 1200B. For example, dummy fin cell 314B includes square partitions T4 and T6 and non-square partitions T1, T2, T3, T5, T7, T8, and T9. Furthermore, the actual values of horizontal dimensions e, a, and f and vertical dimensions c, b, and d for dummy fin cell 314B may also be fixed. The ratios of dimensions given in FIGS. 12A and 12B are purely for the sake of example, and dummy fin cells 314 may be assigned any shape and have any dimension depending on desired layout design.

Figure 13C:
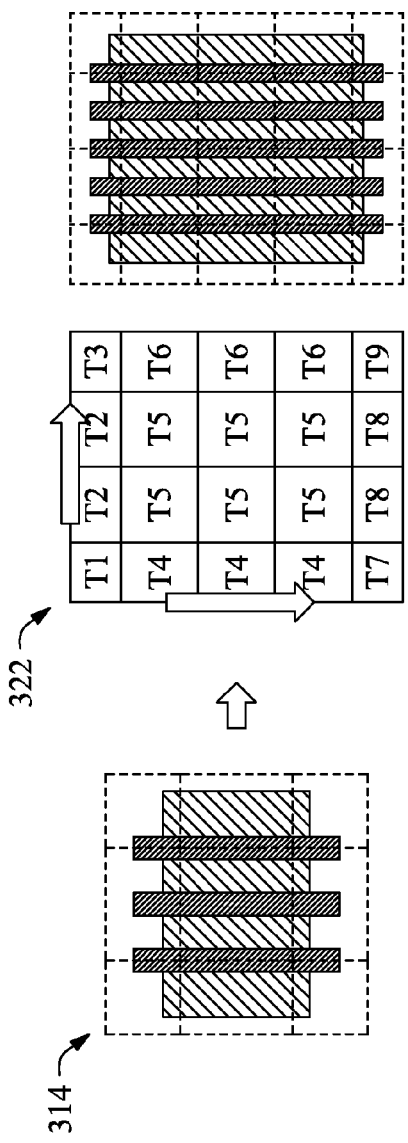

Expanded dummy fin cells 322 may be created using the defined shapes and dimensions of partitions T1 through T9 of a standard dummy fin cell 314. For example, FIGS. 13A-13D illustrate example expanded dummy fin cells formed from partitions T1 through T9 of a standard dummy fin cell 314. In the expanded dummy fin cell 322, corner partitions T1, T3, T7, and T9 may remain constant. Middle partitions T2, T4, T5, T6, and/or T8 may be multiplied by any integer and combined to create expanded dummy fin cell 322. Expansion may be performed in both horizontal and vertical directions. For example, middle columns (including partitions T2, T5, and T8) and middle rows (including partitions T4, T5, and T6) may be doubled (as illustrated by FIG. 13A), tripled (as illustrated by FIG. 13B), or multiplied by any other integer (including one). Alternatively, the top row, bottom row, left column, and/or right column may also be multiplied in addition to or in lieu of multiplying middle columns/rows.

Figure 13D:
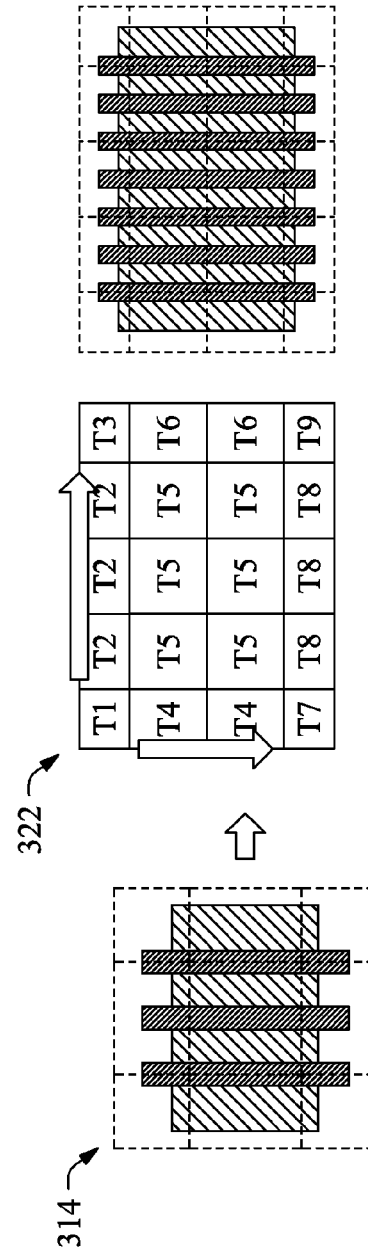

The multiples applied columns and rows in an expanded dummy fin cell 322 may or may not be equal. For example, FIGS. 13A and 13B illustrate expanded dummy fin cells 322 having columns and rows being multiplied by a same integer while FIGS. 13C and 13D illustrate expanded dummy fin cells 322 having columns and rows being multiplied by different integers. FIG. 13C illustrates an embodiment expanded dummy fin cell 322 created by doubling the number of middle columns and tripling the number of middle rows, and FIG. 13D illustrates an embodiment expanded dummy fin cell 322 created by doubling the number of middle columns and tripling the number of middle rows. Other integer multiples may be applied to create expanded dummy fin cells 322 from a standard dummy fin cell 314.

Figure 14A:
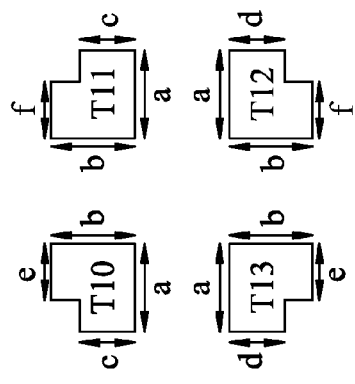
FIGS. 14A-14E illustrate expanded dummy fin cells having varying shapes in accordance with various embodiments.

FIGS. 13A-13D illustrate expanded dummy fin cells 322 that are substantially rectangular. In alternative embodiments, additional partitions may be added to create non-rectangular dummy fin cells 322. For example, FIG. 14A illustrates four L-shaped partitions T10, T11, T12, and T13 that may be used in combination with partitions T1 through T9 to create non-rectangular dummy fin cells 322. The horizontal and vertical dimensions of partitions T10 through T13 are labeled in FIG. 14A so that partitions T10 through T13 may be combined with partitions T1 through T9. For example, a top edge of partition T10 has a horizontal dimension e, which may be matched with partitions T1, T4, and T7 also having horizontal dimensions e. Thus, in an expanded dummy fin cell 322, partitions T1, T4, and/or T7 may be placed above partition T10. Similarly, a bottom edge of partition T10 has a horizontal dimension a, which may be matched with partitions T2, T5, and T8 also having horizontal dimensions a. Thus, in an expanded dummy fin cell 322, partitions T2, T5, and/or T8 may be placed below partition T10. The relation of other dimensions of partitions T10 through T13 may be applied in a similar manner, and further description of these relations is omitted for brevity.

Figure 14B:
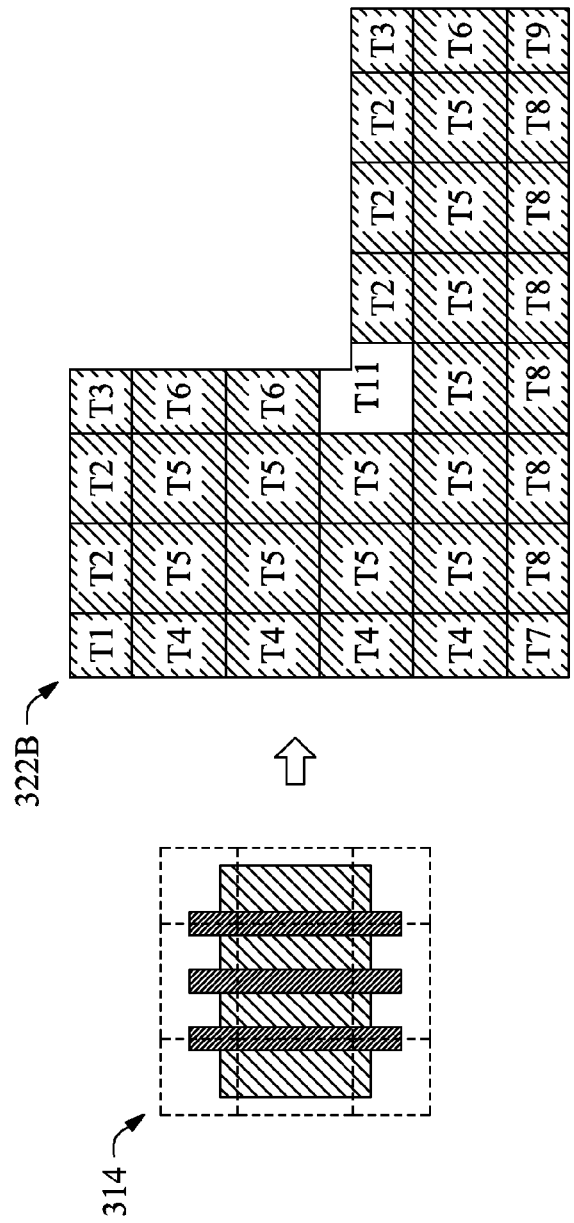
Figures 14C, 14D:
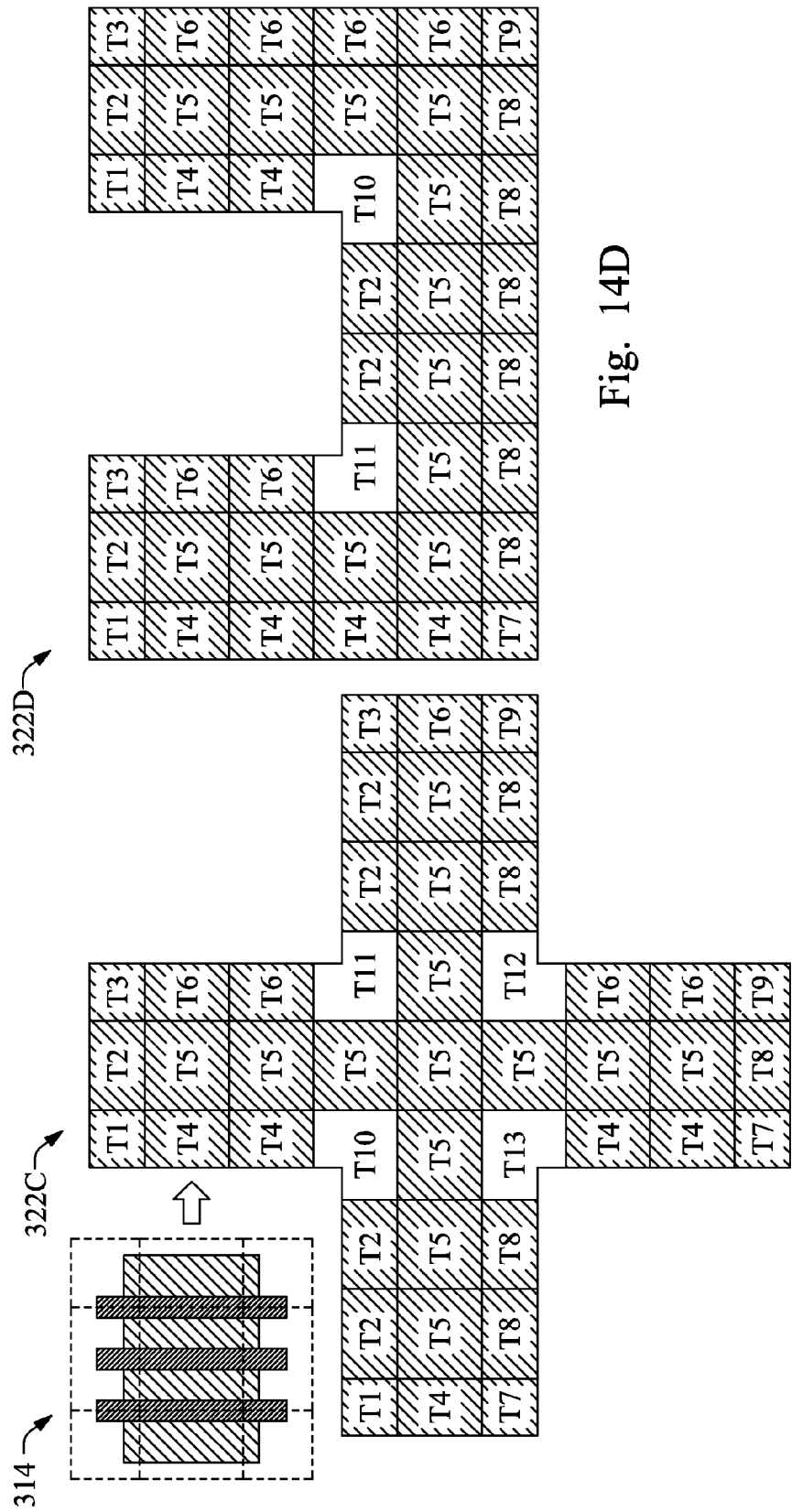
Figure 14E:
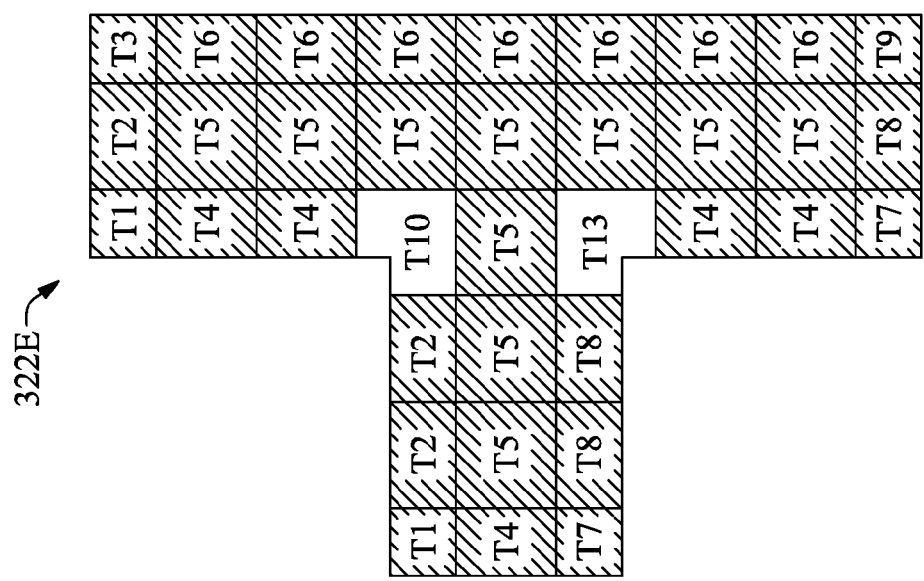

Using L-shaped partitions T10 through T13, expanded dummy fin cells 322 having varying shapes may be formed. For example, FIG. 14B illustrates an L-shaped dummy fin cell 322B using partition T11. FIG. 14C illustrates a cross-shaped dummy fin cell 322C using partitions T10, T11, T12, and T13. FIG. 14D illustrates a U-shaped dummy fin cell 322D using partitions T10 and T11. FIG. 14E illustrates a T-shaped dummy fin cell 322E using partitions T10 and T13. Other configurations of dummy fin cells 322 using partitions T10 through T13 may also be formed. The varying shapes may be used to fill empty regions of an IC layout with increased flexibility.

An advantage to the approach for forming expanded dummy fin cells illustrated by FIGS. 10A-14D is that the size and shape of expanded dummy fin cell 322 is derived from piecing together partitions T1 through T9 of a standard dummy fin cell 314, which is fixed in shape and size. Non-rectangular expanded dummy fin cells 322 may further be formed by including L-shaped partitions T10 through T13. Thus, the IC layout file need not track the individual varying shapes and/or sizes of dummy fin cells 314 and 322 within a layout. Instead, the IC layout file need only track the different configurations of partitions T1 through T13 of various dummy fin cells 314 and 322, and the IC layout file size may be reduced while still retaining the ability to have dummy fin cells and expanded dummy fin cells of varying shapes (both rectangular and non-rectangular shapes) and sizes (both in the horizontal and vertical dimension) for filling empty regions of an IC layout.

In determining the configuration of a standard dummy fin cell 314, flexibility and file size may be balanced. For example, dummy fin cells 314 having smaller dimensions a through f and/or higher dimensional ratios may have increased flexibility and granularity in filling differently sized empty regions of an IC layout. However, dummy fin cells 314 having larger dimensions a through f and/or lower dimensional ratios may require fewer partitions for filling empty regions, which may result in a lower IC layout file size. Thus, flexibility and file size may be balanced when restricting the ratios (e.g., both within a single IC layout and across multiple IC layouts as defined by Tables 1100 and 1000, respectively) and/or dimensions of a standard dummy fin cell 314 in a particular IC layout.

Figure 15:
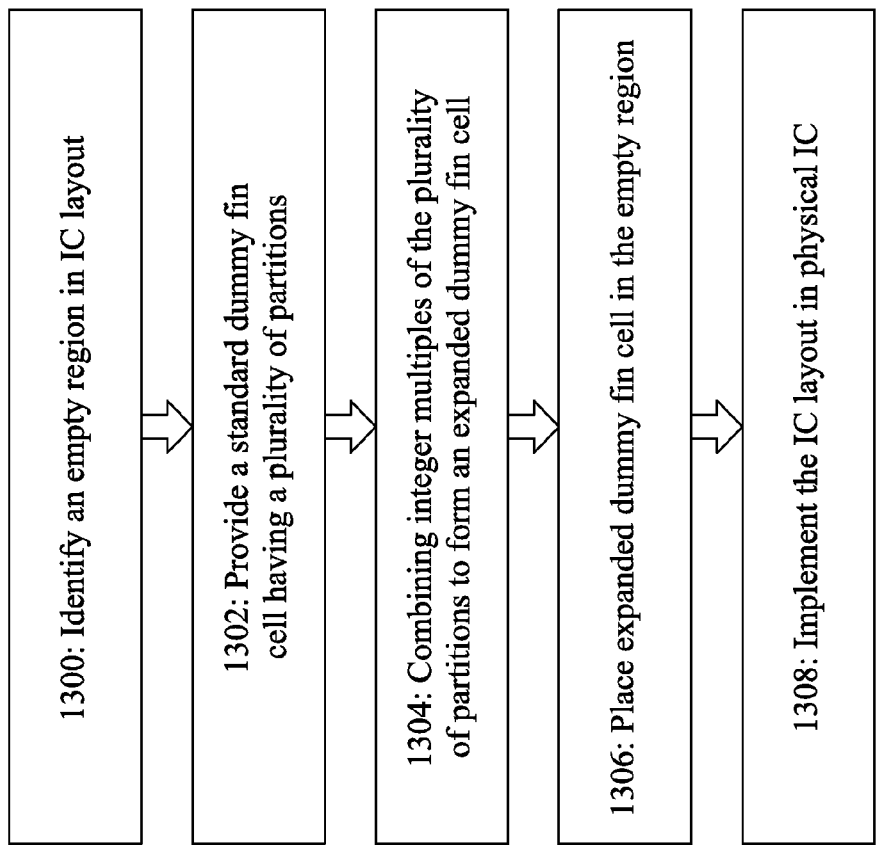
FIG. 15 is a flow diagram illustrating the steps of forming a finFET layout having an expanded dummy fin cell in accordance with various embodiments.

FIG. 15 illustrates an example process flow for including an expanded dummy fin cell in an IC layout in accordance with some embodiments. In step 1300, an empty region (e.g., empty region 306) is identified. The empty region may be separated from an active region having active fin cells by a minimum spacing constraint. Next, in step 1302, a standard dummy fin cell (e.g., dummy fin cell 314) is provided. The standard dummy fin cell may be divided into plurality of partitions. For example, the standard dummy fin cell may be divided into nine partitions (e.g., T1-T9), which may be configured in a three partition by three partition rectangle.

In step 1304, integer multiples of the plurality of partitions are combined to form an expanded dummy fin cell. For example, when the partitions of the standard dummy fin cell is configured in a three partition by three partition rectangle, middle rows and/or middle columns of the three partition by three partition rectangle may be multiplied by integers to create an expanded dummy fin cell. Furthermore, L-shaped partitions (e.g., T10-T13) may be included to form non-rectangular expanded dummy fin cells (e.g., L-shaped expanded dummy fin cell 322B, cross-shaped expanded dummy fin cell 322C, U-shaped expanded dummy fin cell 322D, T-shaped expanded dummy fin cell 322E, combinations thereof, and the like). In step 1306, the expanded dummy fin cell is placed in the empty region of the IC layout, and in step 1308, the IC layout (including the expanded dummy fin cell) may be implemented in a physical IC.

In accordance with an embodiment, a method includes identifying, by a processor, an empty region in an integrated circuit (IC) layout, wherein the empty region is a region not including any active fins. The method further includes providing a standard dummy fin cell and forming an expanded dummy fin cell. The standard dummy fin cell includes a plurality of partitions. The expanded dummy fin cell is larger than the standard dummy fin cell, and the expanded dummy fin cell includes integer multiples of each of the plurality of partitions. The empty region is filled with a plurality of dummy fin cells, wherein the plurality of dummy fin cells includes the expanded dummy fin cell. The plurality of dummy fin cells is implemented in an IC.

In accordance with another embodiment, a method includes identifying, by a processor, an empty region in an IC layout. The IC layout comprises an active fin region, and the empty region is separated from the active fin region by a minimum spacing constraint region. The method further includes dividing a standard dummy fin cell into nine partitions configured in a three partition by three partition rectangle. Vertical and horizontal dimensions of each of the nine partitions are constant within the IC layout. An expanded dummy fin cell larger than the standard dummy fin cell is formed by combining integer multiples of each of the nine partitions. The expanded dummy fin cell is placed in the empty region, and the IC layout is implemented in a physical IC.

In accordance with yet another embodiment, a method includes identifying, by a processor, one or more empty regions in an integrated circuit (IC) layout, wherein the one or more empty regions are regions not including any active fins.

A standard dummy fin cell having a plurality of partitions is provided. The method further includes forming a plurality of expanded dummy fin cells. Each of the plurality of expanded dummy fin cells is larger than the standard dummy fin cell, and each of the plurality of expanded dummy fin cells includes integer multiples of each of the plurality of partitions. A plurality of dummy fin cells is placed in the one or more empty regions. The plurality of dummy fin cells includes the plurality of expanded dummy fin cells, and the plurality of dummy fin cells is implemented in an IC.

Although the present embodiments and their advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for designing an integrated circuit (IC) layout comprising:
   identifying, by a processor, an empty region in an IC layout, wherein the IC layout comprises an active fin region, and wherein the empty region is separated from the active fin region by a minimum spacing constraint region;
   dividing a standard dummy fin cell into nine partitions configured in a three partition by three partition rectangle, wherein vertical and horizontal dimensions of each of the nine partitions is constant within the IC layout;
   forming an expanded dummy fin cell, wherein forming the expanded dummy fin cell comprises combining integer multiples of each of the nine partitions, and wherein the expanded dummy fin cell is larger than the standard dummy fin cell;
   placing the expanded dummy fin cell in the empty region; and
   implementing the IC layout in a physical IC.

2. The method of claim 1, wherein partitions within a same row of the three partition by three partition rectangle have a same vertical dimension, and wherein partitions within a same column of the three partition by three partition rectangle have a same horizontal dimension.

3. The method of claim 1, wherein a first partition of the nine partitions comprises a first horizontal dimension and a first vertical dimension, wherein a second partition of the nine partitions comprises a second horizontal dimension and a second vertical dimension,
   and wherein a first ratio of the first horizontal dimension to the first vertical dimension and second ratio of the second horizontal dimension to the second vertical dimension are equal.

4. The method of claim 1, wherein a first partition of the nine partitions comprises a first horizontal dimension and a first vertical dimension, wherein a second partition of the nine partitions comprises a second horizontal dimension and a second vertical dimension,
   and wherein a first ratio of the first horizontal dimension to the first vertical dimension and second ratio of the second horizontal dimension to the second vertical dimension are not equal.

5. The method of claim 1, wherein forming the expanded dummy fin cell further comprises combining the integer multiples of each of the nine partitions with an L-shaped partition.

6. The method of claim 5, wherein the L-shaped partition comprises a left vertical dimension and a right vertical dimension, wherein a first partition of the nine partitions comprises a first vertical dimension equal to the left vertical dimension, and wherein a second partition of the nine partitions comprises a second vertical dimension equal to the right vertical dimension.

7. The method of claim 6, wherein combining the integer multiples of each of the nine partitions with the L-shaped partition comprises disposing integer multiples of the first partition left of the L-shaped partition and disposing integer multiples of the second partition right of the L-shaped partition.

8. The method of claim 5, wherein the L-shaped partition comprises a top horizontal dimension and a bottom horizontal dimension, wherein a first partition of the nine partitions comprises a first horizontal dimension equal to the top horizontal dimension, and wherein a second partition of the nine partitions comprises a second horizontal dimension equal to the bottom horizontal dimension.

9. The method of claim 8, wherein combining the integer multiples of each of the nine partitions with the L-shaped partition comprises disposing integer multiples of the first partition above the L-shaped partition and disposing integer multiples of the second partition below the L-shaped partition.

10. A method comprising:
    identifying, by a processor, an empty region in an integrated circuit (IC) layout, wherein the empty region is a region not including any active fins;
    dividing a standard dummy fin cell into nine partitions configured in a three partition by three partition rectangle;
    forming an expanded dummy fin cell, wherein the expanded dummy fin cell is larger than the standard dummy fin cell, and wherein the expanded dummy fin cell comprises integer multiples of each of the nine partitions;
    filling the empty region with a plurality of dummy fin cells, wherein the plurality of dummy fin cells comprises the expanded dummy fin cell; and
    implementing the plurality of dummy fin cells in an IC.

11. The method of claim 10, wherein respective vertical and horizontal dimensions of each of the nine partitions is constant within the IC layout.

12. The method of claim 10, wherein the plurality of dummy fin cells further comprises the standard dummy fin cell.

13. The method of claim 10, wherein forming the expanded dummy fin cell comprises multiplying a middle column of the three partition by three partition rectangle by a first integer and multiplying a middle row of the three partition by three partition rectangle by a second integer.

14. The method of claim 13, wherein the first integer and the second integer are equal.

15. The method of claim 13, wherein the first integer and the second integer are not equal.

16. The method of claim 10, wherein the expanded dummy fin is rectangular, L-shaped, cross-shaped, U-shaped, or T-shaped.

17. A method comprising:

identifying, by a processor, one or more empty regions in an integrated circuit (IC) layout, wherein the one or more empty regions are regions not including any active fins;

dividing a standard dummy fin cell into nine partitions configured in a three partition by three partition rectangle, wherein respective vertical and horizontal dimensions of each of the nine partitions is constant within the IC layout;

forming a plurality of expanded dummy fin cells, wherein each of the plurality of expanded dummy fin cells is larger than the standard dummy fin cell, and wherein each of plurality of the expanded dummy fin cells comprises integer multiples of each of the nine partitions;

placing a plurality of dummy fin cells in the one or more empty regions, wherein the plurality of dummy fin cells comprises the plurality of expanded dummy fin cells; and forming the plurality of dummy fin cells in a physical IC.

18. The method of claim 17 further comprising applying a grid map over each of the one or more empty regions, wherein placing the plurality of dummy fin cells in the one or more empty regions comprises placing each of the plurality of dummy fin cells in a grid of the grid map.

19. The method of claim 17, wherein a ratio of a respective vertical dimension to a respective horizontal dimension of each of the nine partitions is constant.

20. The method of claim 17, wherein the plurality of expanded dummy fin cells comprises a rectangular expanded dummy fin cell, an L-shaped expanded dummy fin cell, a cross-shaped expanded dummy fin cell, a U-shaped expanded dummy fin cell, a T-shaped expanded dummy fin cell, or a combination thereof.

* * * * *